United States Patent
Ghafourifar et al.

(10) Patent No.: US 11,494,421 B1
(45) Date of Patent: Nov. 8, 2022

(54) SYSTEM AND METHOD OF ENCRYPTED INFORMATION RETRIEVAL THROUGH A CONTEXT-AWARE AI ENGINE

(71) Applicant: Entefy Inc., Palo Alto, CA (US)

(72) Inventors: Alston Ghafourifar, Los Altos Hills, CA (US); Philip Nathan Greenberg, San Diego, CA (US); Mehdi Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 17/843,865

(22) Filed: Jun. 17, 2022

Related U.S. Application Data

(63) Continuation-in-part of application No. 16/836,744, filed on Mar. 31, 2020, now Pat. No. 11,366,839, (Continued)

(51) Int. Cl.
   *G06F 7/02* (2006.01)
   *G06F 16/00* (2019.01)
   (Continued)

(52) U.S. Cl.
   CPC .......... *G06F 16/313* (2019.01); *G06F 16/148* (2019.01); *G06F 16/2228* (2019.01);
   (Continued)

(58) Field of Classification Search
   CPC .... G06F 16/313; G06F 16/334; G06F 16/148; G06F 16/2228; G06F 16/951; G06F 21/6227
   See application file for complete search history.

(56) References Cited

U.S. PATENT DOCUMENTS

2015/0039887 A1  2/2015  Kahol et al.
2015/0095658 A1  4/2015  Spalka
(Continued)

OTHER PUBLICATIONS

Satoshi, Itchichiki, "Indexing encrypted database field for searching," ITNEXT, Feb. 8, 2020, taken Aug. 23, 2022 from https://itnext.io/indexing-encrypted-database-field-for-searching-e50e7bcfbd80. (Year: 2020).*

*Primary Examiner* — Bruce M Moser
(74) *Attorney, Agent, or Firm* — Haynes and Boone, LLP

(57) ABSTRACT

This disclosure relates to personalized and dynamic server-side searching techniques for encrypted data. Current so-called 'zero-knowledge' privacy systems (i.e., systems where the server has 'zero-knowledge' about the client data that it is storing) utilize servers that hold encrypted data without the decryption keys necessary to decrypt, index, and/or re-encrypt the data. As such, the servers are not able to perform any kind of meaningful server-side search process, as it would require access to the underlying decrypted data. Therefore, such prior art 'zero-knowledge' privacy systems provide a limited ability for a user to search through a large dataset of encrypted documents to find critical information. Disclosed herein are communications systems that offer the increased security and privacy of client-side encryption to content owners, while still providing for highly relevant server-side search-based results via the use of content correlation, predictive analysis, and augmented semantic tag clouds for the indexing of encrypted data.

20 Claims, 20 Drawing Sheets

Related U.S. Application Data which is a continuation of application No. 15/457,322, filed on Mar. 13, 2017, now Pat. No. 10,606,870, which is a continuation of application No. 14/985,907, filed on Dec. 31, 2015, now Pat. No. 9,594,827, which is a continuation-in-part of application No. 14/579,712, filed on Dec. 22, 2014, now Pat. No. 9,639,600.

(51) Int. Cl.

| | | |
|---|---|---|
| *G06F 16/31* | (2019.01) | |
| *G06F 21/62* | (2013.01) | |
| *G06F 16/14* | (2019.01) | |
| *G06F 16/33* | (2019.01) | |
| *G06F 16/22* | (2019.01) | |
| *G06F 16/951* | (2019.01) | |

(52) U.S. Cl.
CPC .......... *G06F 16/334* (2019.01); *G06F 16/951* (2019.01); *G06F 21/6227* (2013.01)

(56) References Cited

U.S. PATENT DOCUMENTS

| | | |
|---|---|---|
| 2015/0281184 A1 | 10/2015 | Cooley |
| 2016/0087944 A1 | 3/2016 | Downey et al. |
| 2017/0026350 A1 | 1/2017 | Dawoud |
| 2022/0078194 A1* | 3/2022 | Grover ................. H04L 9/14 |

* cited by examiner

SYSTEM AND METHOD OF ENCRYPTED INFORMATION RETRIEVAL THROUGH A CONTEXT-AWARE AI ENGINE

CROSS-REFERENCE TO RELATED APPLICATIONS

This application claims priority to, and is a continuation-in-part of, U.S. patent application Ser. No. 16/836,744, filed Mar. 31, 2020, issued as U.S. Pat. No. 11,366,839, which is a continuation of U.S. patent application Ser. No. 15/457,322, filed Mar. 13, 2017, issued as U.S. Pat. No. 10,606,870, which is a continuation of U.S. patent application Ser. No. 14/985,907, filed Dec. 31, 2015, issued as U.S. Pat. No. 9,594,827, which is a continuation-in-part of, U.S. patent application Ser. No. 14/579,712, filed Dec. 22, 2014, issued as U.S. Pat. No. 9,639,600, all are hereby incorporated by reference in their entireties. This application is also related to co-pending, commonly-assigned U.S. patent application Ser. No. 14/187,699, filed Feb. 24, 2014, issued as U.S. Pat. No. 10,169,447 and is hereby incorporated by reference in its entirety.

TECHNICAL FIELD

This disclosure relates generally to systems, methods, and computer readable media for performing highly relevant, dynamic, server-side searching on encrypted data that the server does not have the ability to decrypt.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to a communications experience that many users find fragmented and difficult to search for relevant information in. Users desire a system that will provide for ease of message threading by "stitching" together related communications and documents across multiple formats and protocols—all seamlessly from the user's perspective. Such stitching together of communications and documents across multiple formats and protocols may occur, e.g., by: 1) direct user action in a centralized communications application (e.g., by a user clicking 'Reply' on a particular message); 2) using semantic matching (or other search-style message association techniques); 3) element-matching (e.g., matching on subject lines or senders/recipients/similar quoted text, etc.); and/or 4) "state-matching" (e.g., associating messages if they are specifically tagged as being related to another message, sender, etc. by a third-party service, e.g., a web-mail provider or Instant Messaging (IM) service). These techniques may be employed in order to provide a more relevant "search-based threading" experience for users.

With current communications technologies, conversations remain "siloed" within particular communication formats or protocols, leading to users being unable to search uniformly across multiple communications in multiple formats or protocols and across multiple applications and across multiple other computing devices from their computing devices to find relevant communications (or even communications that a messaging system may predict to be relevant), often resulting in inefficient communication workflows—and even lost business or personal opportunities. For example, a conversation between two people may begin over text messages (e.g., SMS) and then transition to email. When such a transition happens, the entire conversation can no longer be tracked, reviewed, searched, or archived by a single source since it had 'crossed over' protocols. For example, if the user ran a search on their email search system for a particular topic that had come up only in the user's SMS conversations, even when pertaining to the same subject manner and "conversation," such a search may not turn up optimally relevant results.

Users also desire a communications system with increased security and privacy with respect to their communications and documents, for example, systems wherein highly relevant search-based results may still be provided to the user by the system—even without the system actually having the ability to decrypt and/or otherwise have access to the underlying content of the user's encrypted communications and documents. However, current so-called 'zero-knowledge' privacy systems (i.e., systems where the server has 'zero-knowledge' about the data that it is storing) utilize servers that hold encrypted data without the decryption keys necessary to decrypt, index, and/or re-encrypt the data. As such, this disallows any sort of meaningful server-side search process, which would require access to the underlying data (e.g., in order for the data to be indexed) to be performed, such that the encrypted data could be returned in viable query result sets. Therefore, such prior art 'zero-knowledge' systems provide a limited ability for a user to search through a large dataset of encrypted documents to find critical information.

It should be noted that attempts (both practical and theoretical) have been made to design proper 'zero-knowledge' databases and systems that can support complex query operations on fully encrypted data. Such approaches include, among others, homomorphic encryption techniques which have been used to support numerical calculations and other simple aggregations, as well as somewhat accurate retrieval of private information. However, no solution currently known to the inventors enables a system or database to perform complex operations on fully-encrypted data, such as index creation for the purpose of advanced search queries. Thus, the systems and methods disclosed herein aim to provide a user with the ability to leverage truly private, advanced server-side search capabilities from any connected client interface without relying on a 'trusted' server authority to authenticate identity or store the necessary key(s) to decrypt the content at any time.

SUMMARY

A multi-format, multi-protocol, communication system, such as is disclosed herein, may, among other benefits, provide for the semantic analysis of conversations. For example, for a given document or set of communications between two users, there may be only a dozen or so keywords that are relevant and related to the subject matter of the document or set of communications, as determined by one or a number of associated algorithms designed to detect keyword importance. These dozen or so keywords may be used to generate an initial tag cloud or "Small Tag Cloud" on a client device (or in some embodiments, on a central communication server) to associate with the document or communication object being indexed. The Small Tag Cloud can be established based on multiple factors, such as the uniqueness of the word, the number of times a word is repeated, phrase detection, user-specific language patterns, etc. These Small Tag Clouds may then themselves be used to further generate an expanded "predictive tag cloud" or "Large Tag Cloud," e.g., based on the use of Markov techniques or other analysis techniques (e.g., neural networks, deep learning, etc.), based on established language theory, as well as data derived from existing communications data in a centralized communications server, including unique data derived from the communication patterns of one and/or multiple users utilizing the centralized communications server when interacting with one and/or multiple other users and non-users of the centralized communications server.

As mentioned above, some users of such a multi-format, multi-protocol, communication system may also desire increased security and privacy with respect to their documents, e.g., by using 'Private Client-Side Encryption' (refers to any one of multiple client-side encryption techniques wherein the decryption key is not shared with any server authority and thus is held as "private" to the client device used. Private Client-Side Encryption can serve to sufficiently obfuscate document content such that a server authority does not have access to the sensitive original data. In addition to this added security and privacy, users may still want to take advantage of advanced capabilities such as content search which can in some cases require a server to have the ability to openly index and analyze the sensitive original data in order to return relevant search results on the user's documents and communications. However, by using any standard Private Client-Side Encryption process, the server will not be able to analyze said content and therefore, not be able to fulfill the request to user satisfaction, instead relying at best on open metadata, such as filenames, dates, type, etc. as available. To enable this case, the aforementioned Small Tag Cloud and for each document or communication object can be generated on the client device through one or multiple of the various methods, such as those described herein.

The original document or communication object may be fully encrypted using any one of a variety of applicable Private Client-Side Encryption methods and uploaded to the trusted central server authority along with the corresponding client-generated Small Tag Cloud. The central server authority may process the Small Tag Cloud using semantic analysis and any one of the multiple applicable analysis methods, such as those described herein. The fully-encrypted document source may then be packaged with the Small Tag Cloud and stored as a single "object" for future recall in the system database. The Small Tag Cloud analysis yields a matching Large Tag Cloud. The Large Tag Cloud may be treated as a 'substitute' for the original content and may be used for full text search and index classification.

To improve the accuracy of the index map created using the Large Tag Cloud, the central server authority may attempt to isolate the corresponding Small Tag Cloud and compare that Small Tag Cloud to other Small Tag Clouds generated throughout the system. As such, not all Small Tag Clouds are necessarily created via Private Client-Side Encrypted, instead, every item uploaded to the central server authority, in addition to being indexed and stored in pure form, may generate a Small Tag Cloud designed to mimic the client device process. This way, the encrypted content's Small Tag Cloud can be compared to the Small Tag Cloud of any other content item in the system—including content items that were originally received in a different messaging format (e.g., audio or video) and/or via a different message delivery protocol (e.g., via SMS or MMS)—to detect similarity.

When the query system detects a Small Tag Cloud match, then the system may attempt to evaluate the true index of the unencrypted content to further match and, by extension, enrich, the original Large Tag Cloud for the encrypted content. In this way, an example document (e.g., a financial report) can be locally encrypted, shared with a central server authority, and subsequently discovered with high confidence using search by assessing similarities between the abstract client-generated data and the detailed index fingerprint of other "financial reports" throughout the system, creating a probabilistic relationship between the encrypted data (blind to the server) and the readable data known to the server.

The methods described herein may thus be used to improve message and document indexing and provide enhanced relevancy in search results on encrypted data that the central communications server cannot decrypt. In other words, even if the central communications server does not know the actual underlying content stored in a document, e.g., in the case of a document that has been client-side encrypted and that the server does not have the encryption key for, the server may still be able to return relevant encrypted documents to the client in a results set of a server-side search by leveraging the information stored in the unencrypted indexed small and large tag clouds that the central communications server does have access to. In doing so, the centralized communications server may locate and return documents that may contain information relevant to the user's initial search query—even though the server does not have access to the true underlying content of the documents that it is returning. In this way, the central communications server preserves fine-grained privacy, while simultaneously providing a revolutionary search capability.

DETAILED DESCRIPTION

Figure 1A:
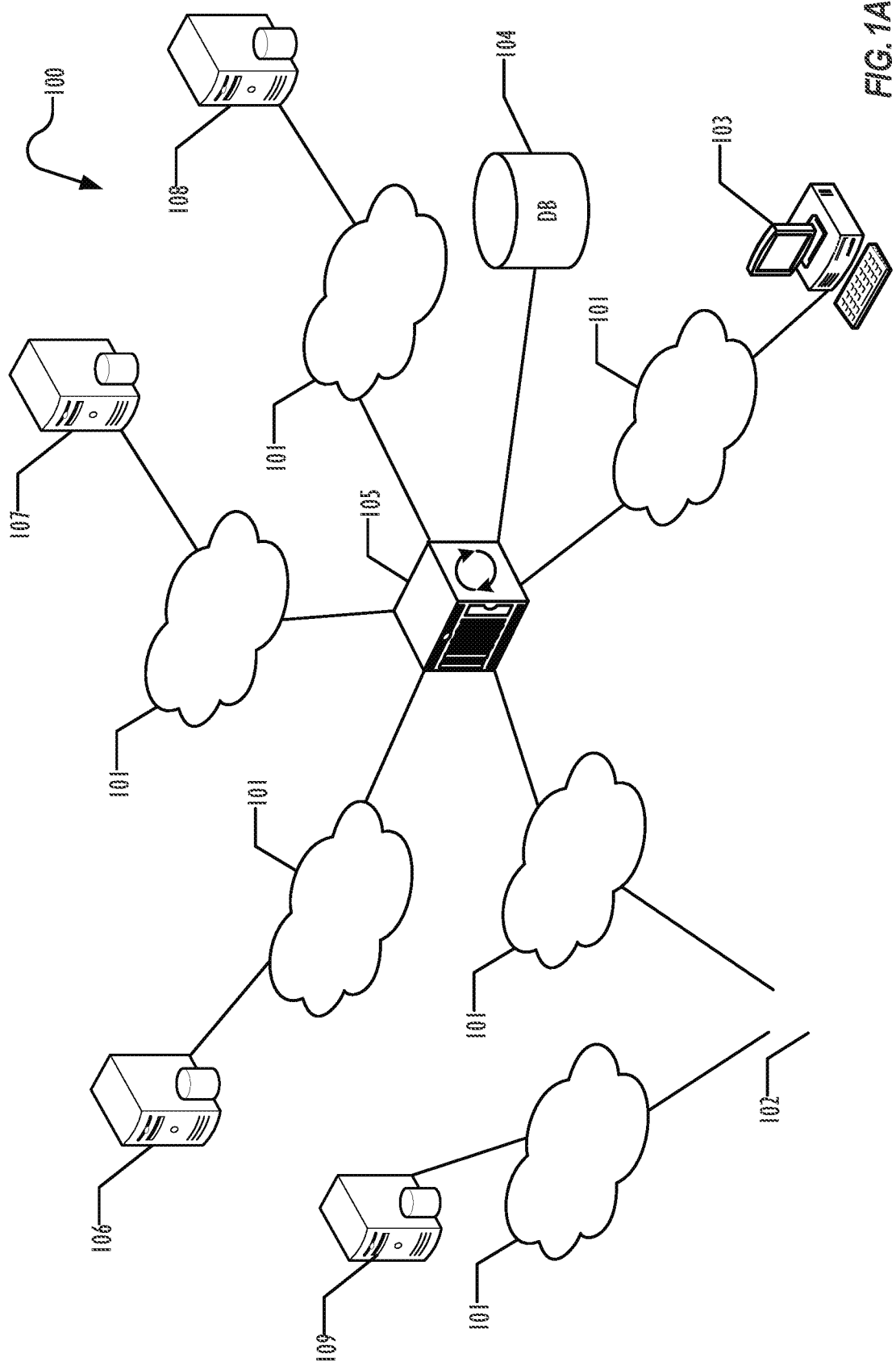
FIG. 1A is a block diagram illustrating a server-entry point network architecture infrastructure, according to one or more disclosed embodiments.

Disclosed are systems, methods, and computer readable media for intelligent, personalized, and/or search-based threading of messages and/or other forms of communication for computing devices across multiple formats and multiple protocols. More particularly, but not by way of limitation, this disclosure relates to systems, methods, and computer readable media to permit computing devices, e.g., smartphones, tablets, laptops, wearables, and the like, to present users with a seamless, multi-format, multi-protocol, communication threading system that may also perform semantic and predictive analysis based on the content of the multi-format, multi-protocol communications that are stored by a centralized communications server.

Use of a multi-format, multi-protocol, communication threading system allows users to view/preview all their messages, conversations, documents, etc., which are related (or potentially related) to a particular query, in a single unified results feed. Such a multi-format, multi-protocol, communication threading system may also provide the ability to "stitch" together communications across one or more of a variety of communication protocols, including SMTP, IMAP/POP, SMS/MMS, XMPP, and/or social media protocols. Further, the use of semantic and predictive analysis on the content of a user's communications may help the user discover potentially valuable and relevant messages, conversations, documents, etc., that would not be returned by current string-based or single-format/single-protocol, index-based searching techniques.

Also disclosed are systems, methods, and computer readable media for dynamic, server-side searching of encrypted documents, messages and/or other forms of communication for computing devices across multiple formats and multiple protocols. More particularly, but not by way of limitation, this disclosure, as described above, relates to systems, methods, and computer readable media that combine client-generated Small Tag Clouds (comprising of keywords related to the underlying content of the document, message, etc.) with advanced Markovian techniques or other analysis techniques (e.g., neural networks, deep learning, etc.) to create server-side Large Tag Clouds around the otherwise fully-encrypted content. The Large Tag Cloud may then be compared at the server to other small and large tag clouds that have been generated for non-encrypted content that may share content-based similarities with the encrypted content in question. If a match is found between the tag clouds of the encrypted content in question and the tag clouds of one or more unencrypted (or encrypted) documents stored at the server, the encrypted content in question's tag cloud may be correlated with the tag clouds of the one or more matched unencrypted (or encrypted) documents, thus allowing the server to provide more relevant search results to the user—including the return of likely-relevant encrypted documents that the server does not actually have access to or the ability to decrypt.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third-party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third-party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a represents a third-party instant message server (e.g., a YAHOO!® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third-party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third-party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third-party servers 106-109 may not need to be contacted.

Figure 1B:
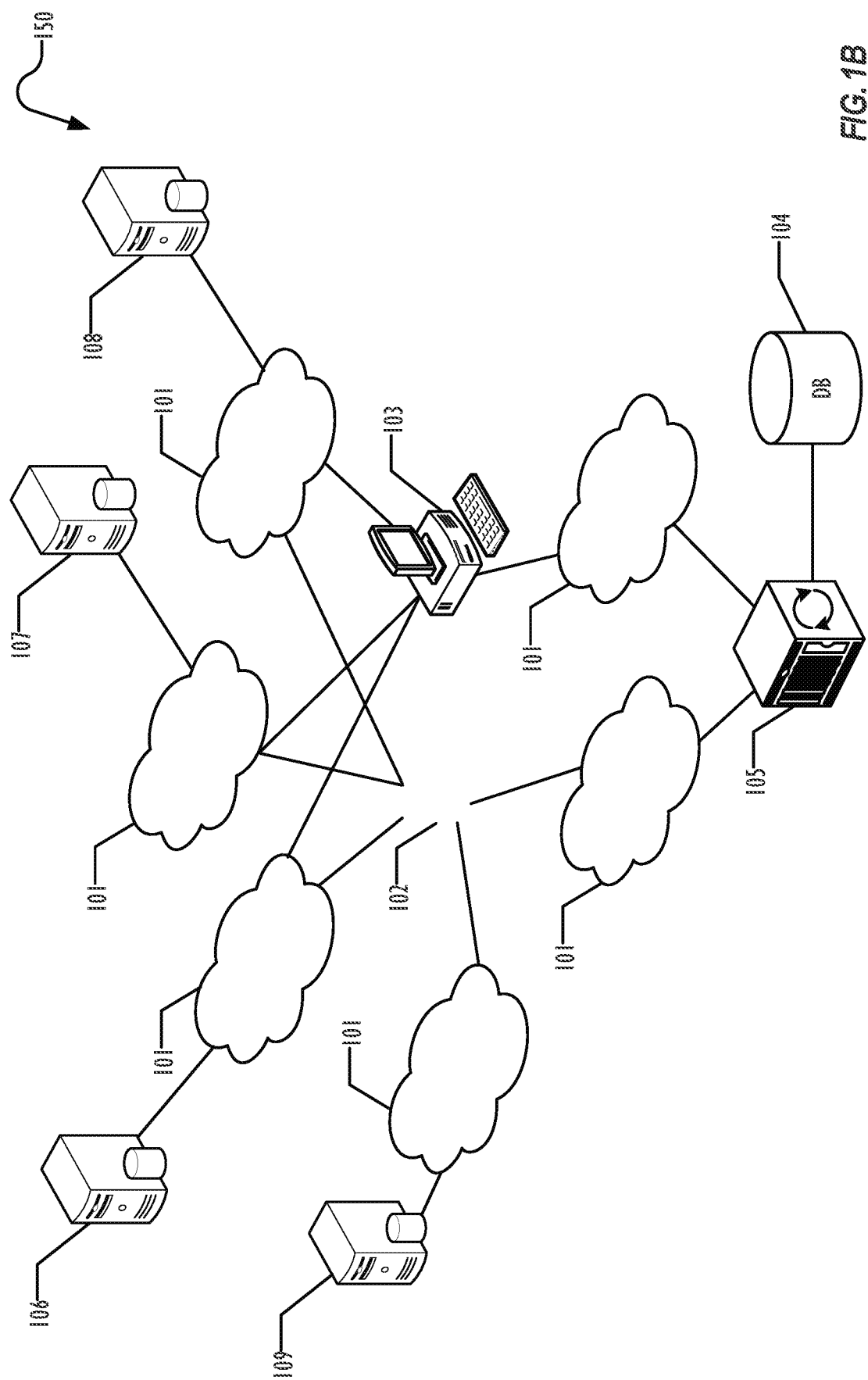
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third-party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third-party servers.

Figure 2A:
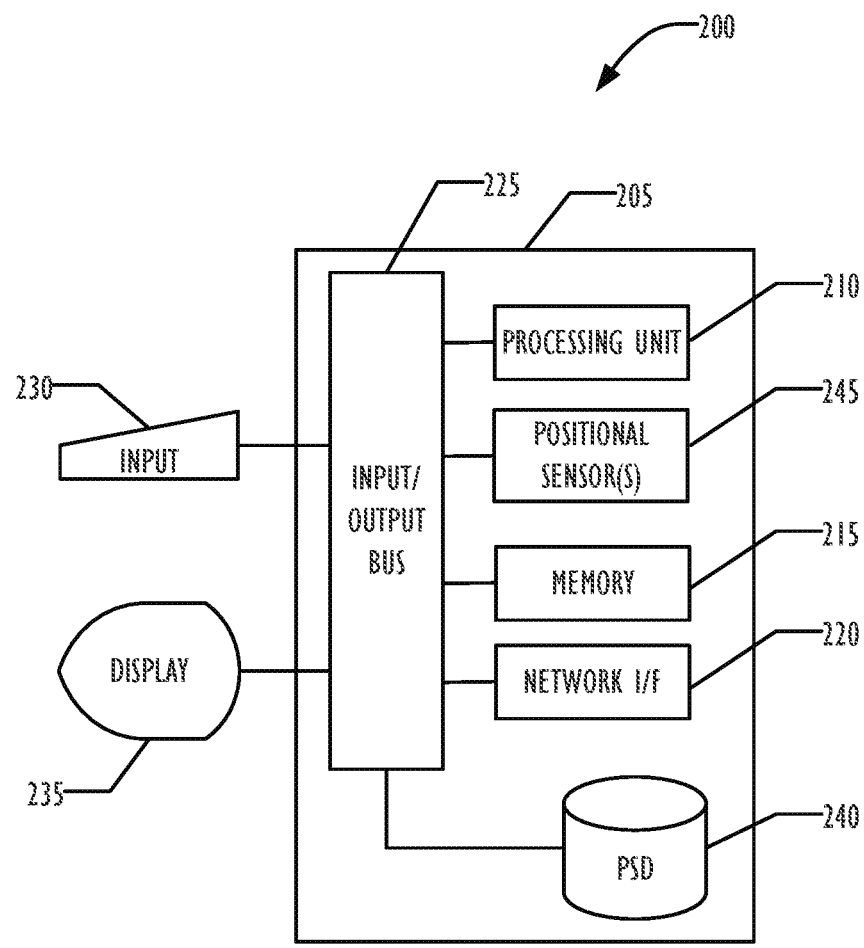
FIG. 2A is a block diagram illustrating a computer which could be used to execute the multi-format, multi-protocol contextualized indexing approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
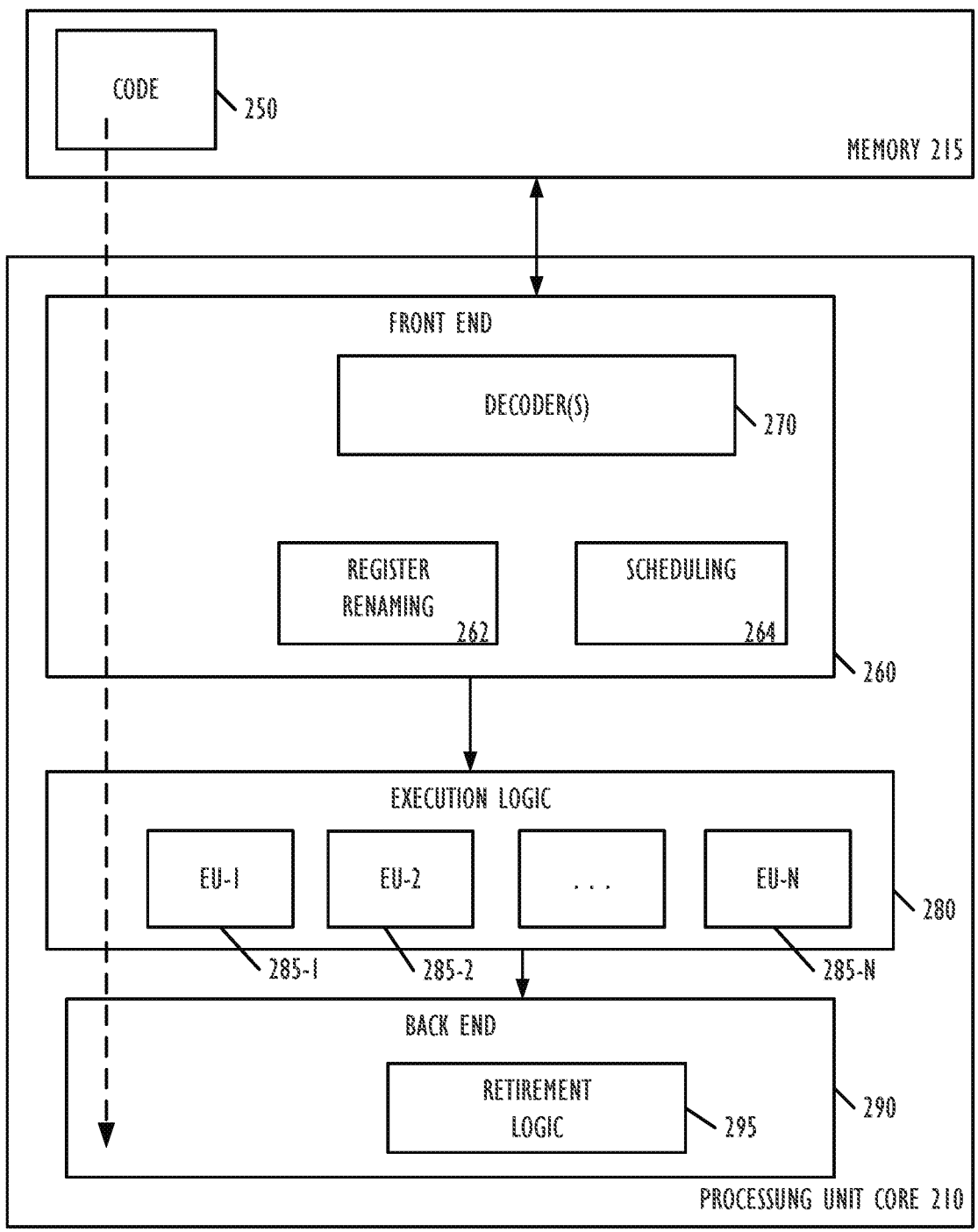
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front-end portion 260 and is processed by one or more decoders 270. The decoder may generate as its output a micro-operation such as a fixed width micro-operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, backend logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Multi-Protocol, Multi-Format Inbox Feed

Figure 3A:
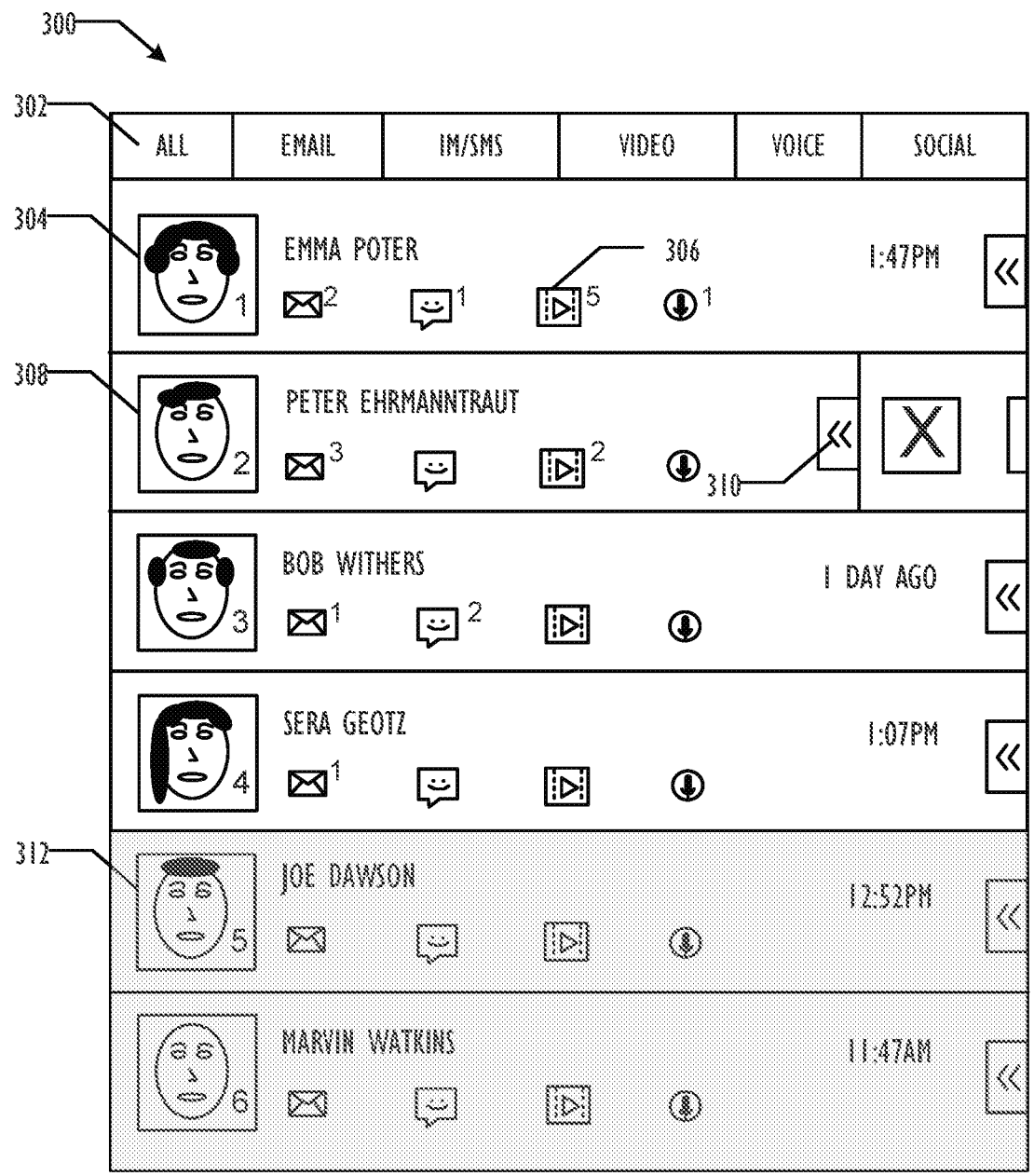
FIG. 3A is an example of a multi-protocol, person-centric, multi-format inbox feed, according to one or more disclosed embodiments.

FIG. 3A shows an example of a multi-protocol, person-centric, multi-format inbox feed 300, according to one or more disclosed embodiments. The inbox feed 300 shown in FIG. 3A may, e.g., be displayed on the display of a mobile phone, laptop computer, or other computing device. In certain embodiments, elements of inbox feed 300 may be interacted with by a user utilizing a touchscreen interface or any other suitable input interface.

As is shown across the top row of the interface 302, the multi-format, multi-protocol messages received by a user of the system may be grouped by protocol (e.g., Email, IM/SMS, Video, Voice, etc.), or all messages may be combined together into a single, unified inbox feed, as is shown in FIG. 3A. Row 304 in the example of FIG. 3A represents the first "person-centric" message row in the user's unified inbox feed. As shown in FIG. 3A, the pictorial icon and name of the sender whose messages are listed in row 304 appear at the beginning of the row. The pictorial icon and sender name indicate to the user of the system that all messages that have been aggregated in row 304 are from exemplary user 'Emma Poter.' Note that any indication of sender may be used. Also present in row 304 are several graphical icons 306 that represent links to messages of different types that have been received from Emma Poter. For example, Emma Poter has sent the particular user whose inbox feed is shown in FIG. 3A two email messages, one instant message, five video messages, and one voice message. The user interface may utilize icons, as is shown in FIG. 3A, or it may use any other suitable form of indication, such as text, grids, charts, or any other form of personalized identification. The types of messages/communication used in the inbox feed may be selected or personalized, as well. The timestamp (e.g., 1:47 pm in row 304) may be used to indicate the time at which the most recently received message has been received from a particular sender.

Moving down to row 308 of inbox feed 300, messages from a second user, Peter Ehrmanntraut, have also been aggregated into a single row of the feed. As is displayed on the righthand side of row 308 is reveal arrow 310. Selection of reveal arrow 310 may provide additional options to the user such as to reply, delay reply/delay send, forward, return a call, favorite, archive, or delete certain message from a particular sender. Further, the reveal action may conveniently keep the user on the same screen and allows for quick visual filtering of messages. Gestures and icon features may help the user with the decision-making process regarding the choice to reply, delay replying (including the time delaying of response across multiple protocols), delete, mark as spam, see a full message, translate, read, or flag a message as being unread. With respect to the "delay reply/delay send" option, the multi-protocol, multi-format communication system may determine, based on the determined outgoing message format and protocol, that a particular communication in a particular format (or that is being sent via a particular protocol) should be delayed before being sent to the recipient. For example, a video or voice message may not be appropriate to send at midnight, and so the system may delay sending the message until such time as the recipient is more likely to be awake, e.g., 9:00 am. On the other hand, the outgoing message is in text format and being delivered via the SMS protocol, sending the message at midnight may be more socially appropriate. Delay reply/delay send may also take into account the time zone of the recipient and choose a more socially appropriate delivery time for a message based on the recipient's local time.

Finally, moving down to row 312, the 'grayed-out' characteristic of the row may be used to indicate that there are no remaining unread/unopened messages of any format or protocol type remaining from a particular sender. Alternately, each message type may be individually grayed out, indicating that there are no new messages of a particular type. It is to be understood that the use of a grayed-out row is merely exemplary, and that any number of visual indicators may be used to inform the user of the device that no unread messages remain.

As may now be appreciated, the multi-protocol, person-centric, multi-format inbox feed 300 of FIG. 3A may provide various potential benefits to users of such a system, including: presenting email, text, voice, video, and social messages all grouped/categorized by contact (i.e., 'person-centric,' and not subject-people-centric, subject-centric, or format-centric); providing several potential filtering options to allow for traditional sorting of communications (e.g., an 'email' view for displaying only emails); and displaying such information in a screen-optimized feed format. Importantly, centralization of messages by contact may be employed to better help users manage the volume of incoming messages in any format and to save precious screen space on mobile devices (e.g., such a display has empirically been found to be up to six to seven times more efficient that a traditional inbox format). Further, such an inbox feed makes it easier for a user to delete unwanted messages or groups of messages (e.g., spam or graymail). The order of appearance in the inbox feed may be customized as well. The inbox feed may default to showing the most recent messages at the top of the feed. Alternatively, the inbox feed may be configured to bring messages from certain identified "VIPs" to the top of the inbox feed as soon as any message is received from such a VIP in any format and/or via any protocol. The inbox feed may also alert the user, e.g., if an email, voice message, and text have all been received in the last ten minutes from the same person—likely indicating that the person has an urgent message for the user. The inbox feed may also identify which companies particular senders are associated with and then organize the inbox feed, e.g., by grouping all communications from particular companies together.

In other embodiments, users may also select their preferred delivery method for incoming messages of all types. For example, they can choose to receive their email messages in voice format or voice messages in text, etc.

Figure 3B:
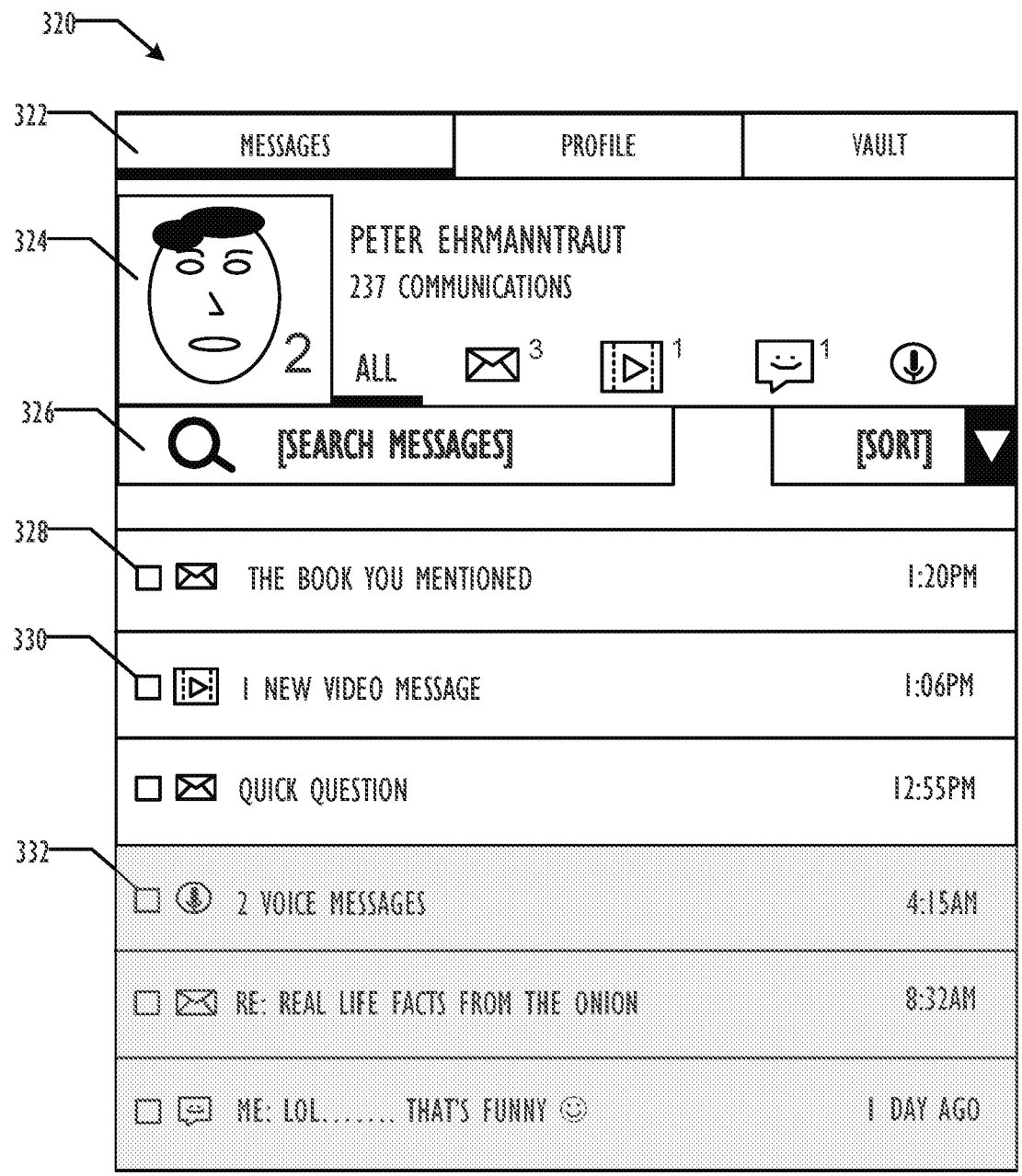
FIG. 3B is an example of a multi-protocol, multi-format inbox feed for messages to and from a particular user, according to one or more disclosed embodiments.

Referring now to FIG. 3B, an example of a multi-protocol, multi-format inbox feed for messages to and from a particular user 320 is shown, according to one or more disclosed embodiments. As is shown across the top row of the interface 322, the messages from a particular user, in this case 'Peter Ehrmanntraut' may be displayed in a single multi-format, multi-protocol message feed. Row 322 in the example of FIG. 3B also presents the user with the opportunity to select the particular sender's 'Messages,' Profile,' or 'Vault' storage, which is a document repository of files shared between the user and a particular sender (e.g., email attachments, MIMS, etc.). As shown in FIG. 3B, the pictorial icon 324 and name of the sender whose messages are listed in interface 320 appear at the top of the communications page. Also present in interface 320 is search icon 326, which may be activated to search across all documents and/or message formats and protocols (e.g., including voice, video, SMS, and email messages) from a particular sender and/or for a particular search term(s) or topic, as will be described in further detail below. Message items may also be sorted in the feed by various characteristics such as time of receipt, format, or other content and/or semantic-based ranking schemes. Moving down to the messages portion of interface 320, checkbox 328 represents the first email message received from user Peter Ehrmanntraut, whereas checkbox 330 represents the first new video message from user Peter Ehrmanntraut. Finally, grayed-out checkbox 332 represents an aggregation of voice messages that have already been listened to by the user.

Figure 3C:
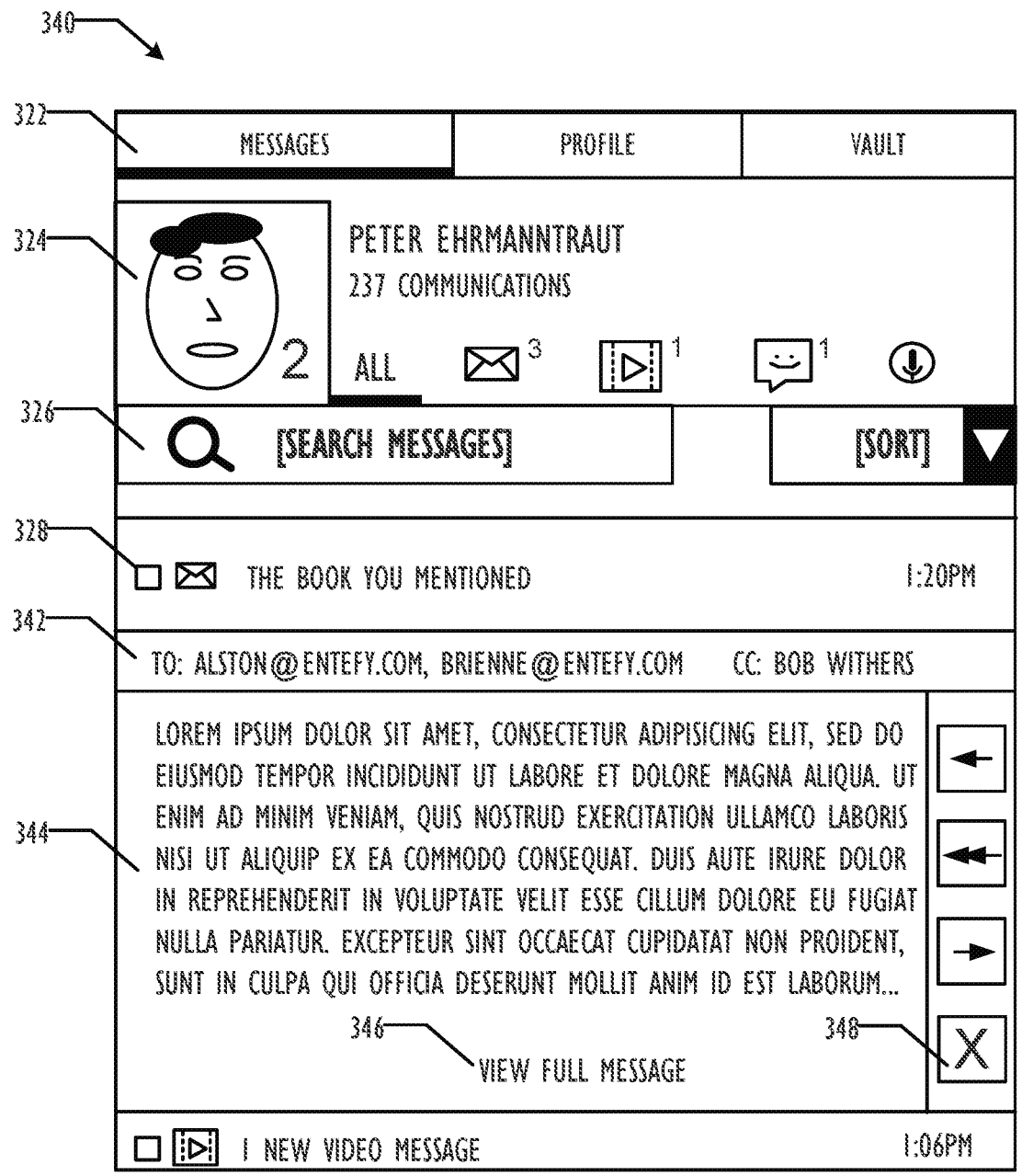
FIG. 3C is an example of a preview pane for a multi-protocol, multi-format inbox feed for messages to and from a particular user, according to one or more disclosed embodiments.

Referring now to FIG. 3C, an example of a preview pane 340 for a multi-protocol, multi-format inbox feed for messages to and from a particular user is shown, according to one or more disclosed embodiments. As is displayed in FIG. 3C, the message associated with checkbox 328 has been opened to provide a more in-depth preview of the associated email text. According to some embodiments, the recipients 342 are listed out above the body 344 of the email, and a link 346 may be activated that causes the application to retrieve the full email message from either the system's sync server or third-party email servers. The interface may also provide a number of preview quick action buttons 348 to be performed on the message that is being previewed, e.g., reply, reply all, forward, delete, etc.

Multi-Format, Multi-Protocol, Communication Threading System

As mentioned above, there are multiple ways by which the centralized communication system may associate or "stitch" together multiple messages across disparate messaging formats and protocols, creating a "relationship" between each associated message. Such relationships, which may be created uniquely for a variety of messages in a variety of formats and protocols through the system, may be used to create a "relationship map," i.e., a cluster of relationships connecting each message to other messages with varying degrees of separation. The relationship map may be analyzed to determine communication patterns (e.g., system-wide or on a per-user basis), provide greater search relevancy with messages across format/protocols, and provide other such insights and benefits.

According to a first embodiment, direct user actions taken in a centralized communications application may be used to associate messages as part of the same thread of conversation. For example, if a user has 'Message 1' open and clicks a 'Reply' button in the multi-format, multi-protocol communication application, thus opening a 'Message 2,' then the system may know to associate 'Message 1' and 'Message 2' together as being part of the same "thread," even if, for instance, 'Message 1' was received via an SMS protocol and 'Message 2' is eventually sent via an email protocol using the multi-format, multi-protocol communication application. Direct user actions taken from within the multi-format, multi-protocol communication application may be logged by the application, synced with the centralized communication server and any other properly authenticated client(s), and stored for future recall when a user requests to see a "message thread" view.

According to a second embodiment, the system may use semantic matching (or other search-based/keyword message association techniques) to associate messages and/or documents together. A variety of semantic and search-based/keyword techniques for associating related messages will be discussed in further detail below in reference to FIGS. 4-7.

According to a third embodiment, element-matching techniques may be employed to associate messages. For example, messages that match each other based on subject lines or senders/recipient lists, or which have similar quoted text within them, etc., may be intelligently associated together—even if the centralized system has not been provided with data that otherwise affirmatively associates the messages together as being a part of the same messaging thread or chain. This embodiment will be discussed in further detail below in reference to FIG. 3G.

According to a fourth embodiment, "state-matching" techniques may be employed to associate messages. For example, certain third-party services which can integrate with the centralized communication system (hereinafter, a "Valid Third-Party Service") may specifically tag a message as a "Reply" to another message, and, thus, the centralized system may associate such messages as a part of the same thread or chain, even if the action to send the initial Reply message took place outside of the centralized communication system, i.e., was made directly via the Valid Third-Party Service's system.

One or more of the four techniques outlined above may be used in combination with each other in order for the system to most effectively thread together disparate messages and/or documents across multiple formats and/or multiple protocols in a way that is most beneficial for the individual user of the centralized communication system.

Figure 3D:
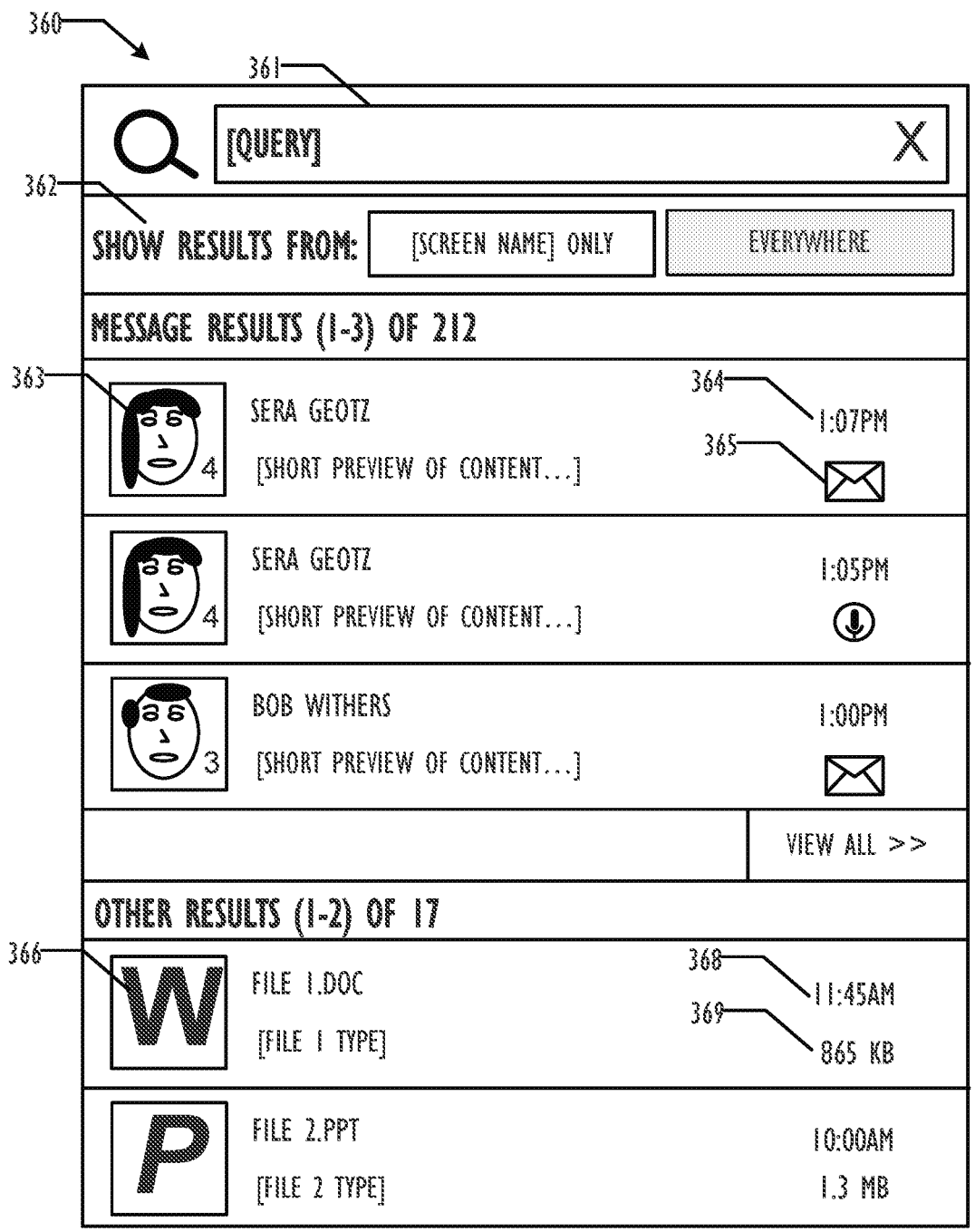
FIG. 3D is an example of a multi-format, multi-protocol, contextualized communication search results page for a particular query, according to one or more disclosed embodiments.

Referring now to FIG. 3D, an example of a multi-format, multi-protocol threaded communication search results page 360 for a particular query is shown, according to one or more disclosed embodiments. At the top of the page 360 may be a search input box 361. A user may, e.g., enter his desired query string into the search input box 361 and then click on the magnifying glass icon to initiate the search process. Search results row 362 may be used for providing the user with a choice of additional search-related features. For example, the user may be provided with a selection between a "global" search, i.e., searching everywhere in the application's ecosystem, and a "narrow" search, i.e., searching only through content on a screen or small collection of screens. As shown in FIG. 3D, search results 363 may be displayed in a unified feed or grouped by type (e.g., messages, files, etc.), query type, search area selection (e.g., "global" v. "narrow"), or time. Each search result may optionally include an indication of the messages format 365 and/or a time stamp 364 to provide additional information to the user. A given implementation may also optionally employ an "Other Results" feed 366 as a part of the same user interface that displays the search results 363. These results could come from sources other than traditional message-related sources, e.g., a user's personal file collection stored with a central database, files from other users stored in the central database that the searching user has been granted read access to, personal profile information from contacts of the user, etc. Additionally, these search results could include relevant client-side encrypted documents that the server does not have access to or the ability to decrypt, as will be discussed in further detail below in reference to FIGS. 6-7.

Figure 3E:
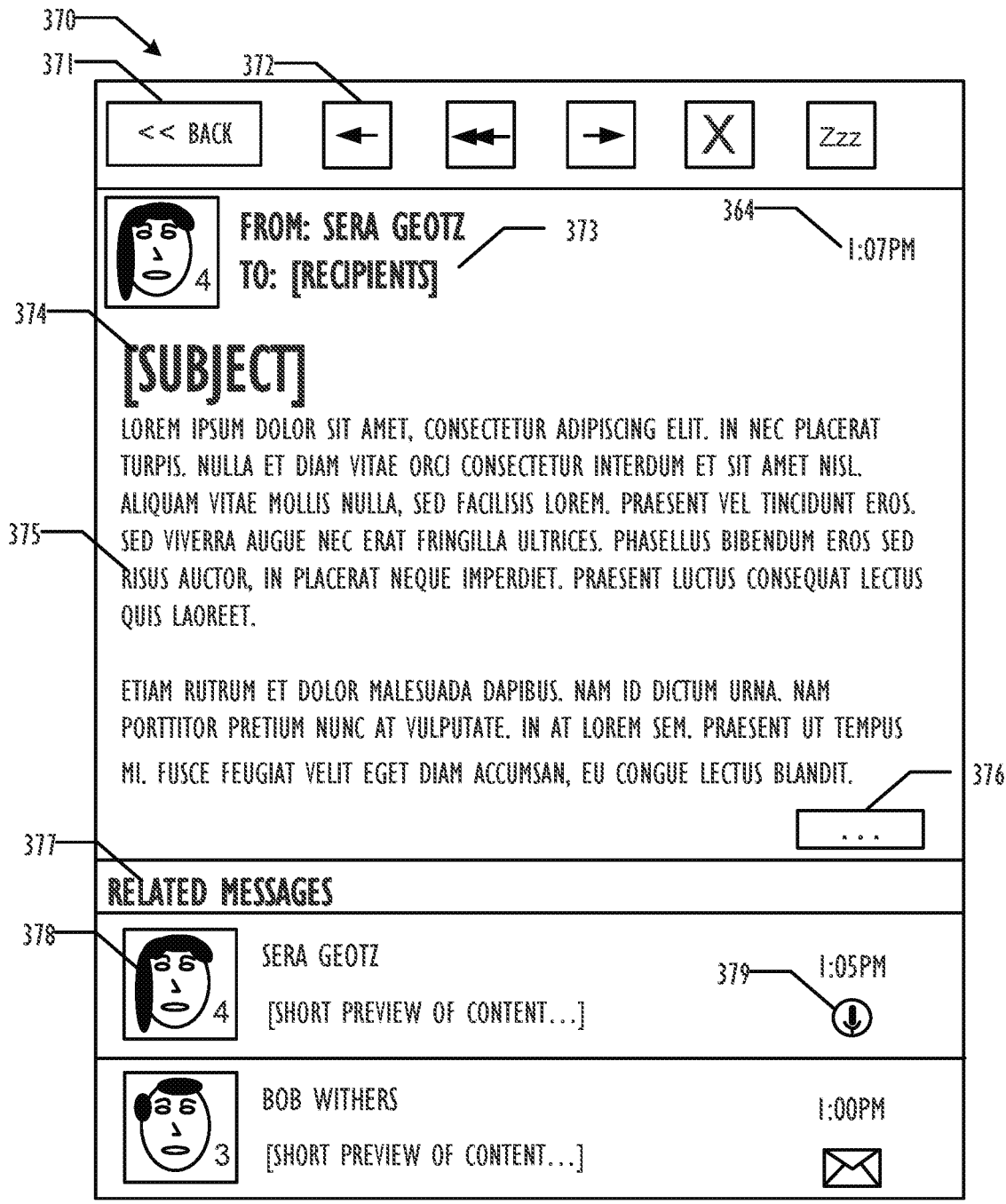
FIG. 3E is an example of a stitching view mode for a multi-format, multi-protocol communication system, according to one or more disclosed embodiments.

Referring now to FIG. 3E, an example of a stitching view mode for a multi-format, multi-protocol communication system 370 is shown, according to one or more disclosed embodiments. According to some embodiments, across the top of the user interface may be located various user interface elements such as a "Back" button 371, and other message action buttons 372 (e.g., reply, reply all, forward, delete, sleep, archive, etc.). Next, the active message 373 content may be displayed in a portion of the screen, including a subject line 374, message content 375, time stamp 364, and optionally a quoted text button 376, which may be activated by the user to display previous conversation history, such as old emails in the thread, full SMS trails, etc. A given implementation may also optionally employ a "Related Messages" feed 377 as a part of the same user interface that displays the selected message 373. These related messages 378 could include parsed content from the body of the selected messages (i.e., previously recorded replies and forwards), as well as messages across other formats and protocols (represented by icon 379), such as voice messages, SMS conversations, and phone call log entries. (It is to be understood that a similar view mode may be used for displaying "Other Results," such as files, documents, contact information, etc.)

Figure 3F:
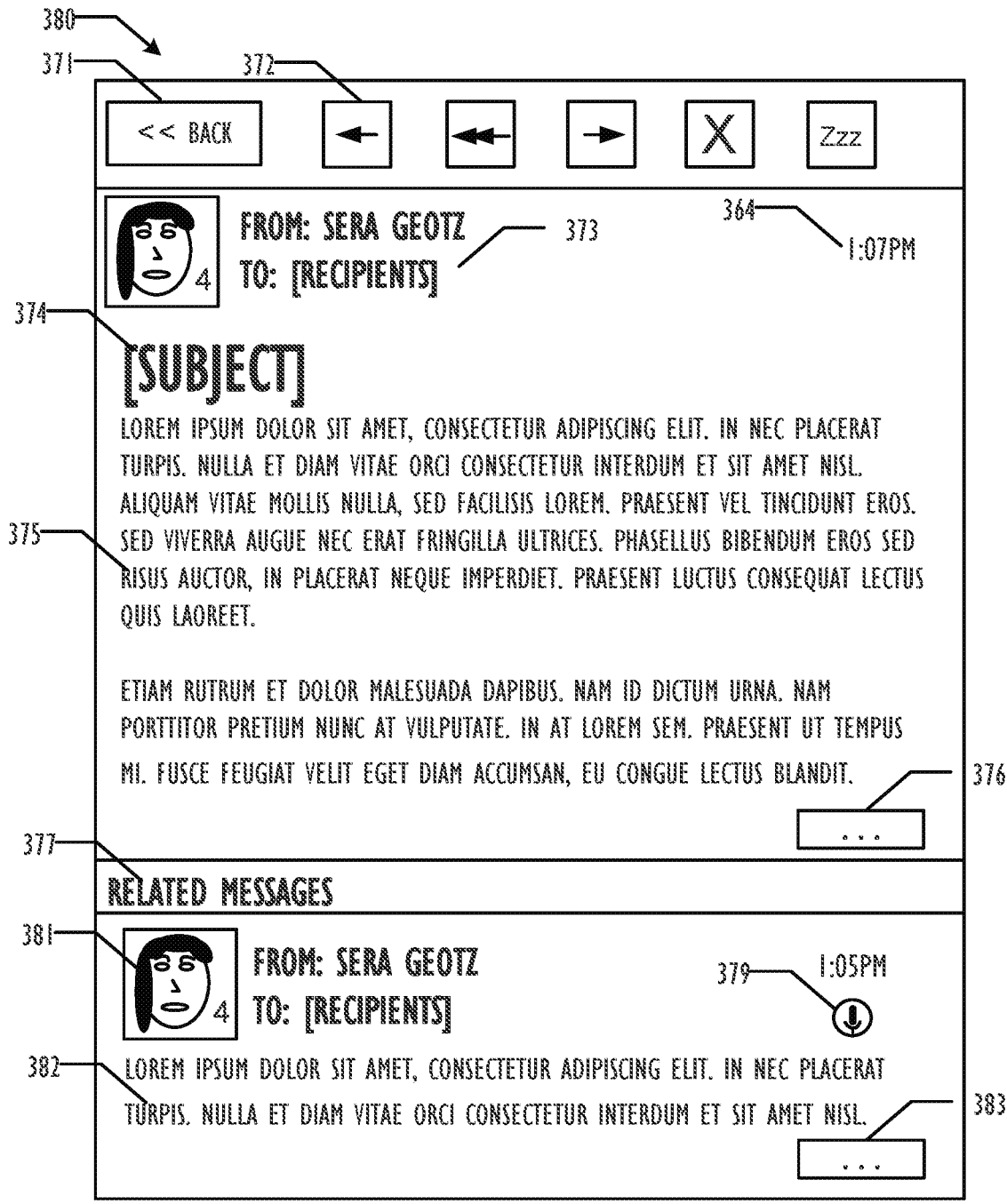
FIG. 3F is an example of a stitching view mode with an expanded message for a multi-format, multi-protocol communication system, according to one or more disclosed embodiments.

Referring now to FIG. 3F, an example of a stitching view mode with an expanded message for a multi-format, multi-protocol communication system 380 is shown, according to one or more disclosed embodiments. Related message preview 381 may be displayed on the screen, e.g., in response to the user selecting a particular related message 378 from the related messages feed 377. Related messages previews can be selected by the user to open the full details of a message without leaving the threaded results screen. A quoted text button 383 may also be activated by the user to display additional content from the related message. Options to further explore original content may also be made available to the user via the related message 381 interface, e.g., taking the user to see the original SMS thread belonging to the single SMS message shown in the related message 381 interface. (It is to be understood that a similar expanded view mode may be used for displaying "Other Results," such as files, documents, contact information, etc.)

Figure 3G:
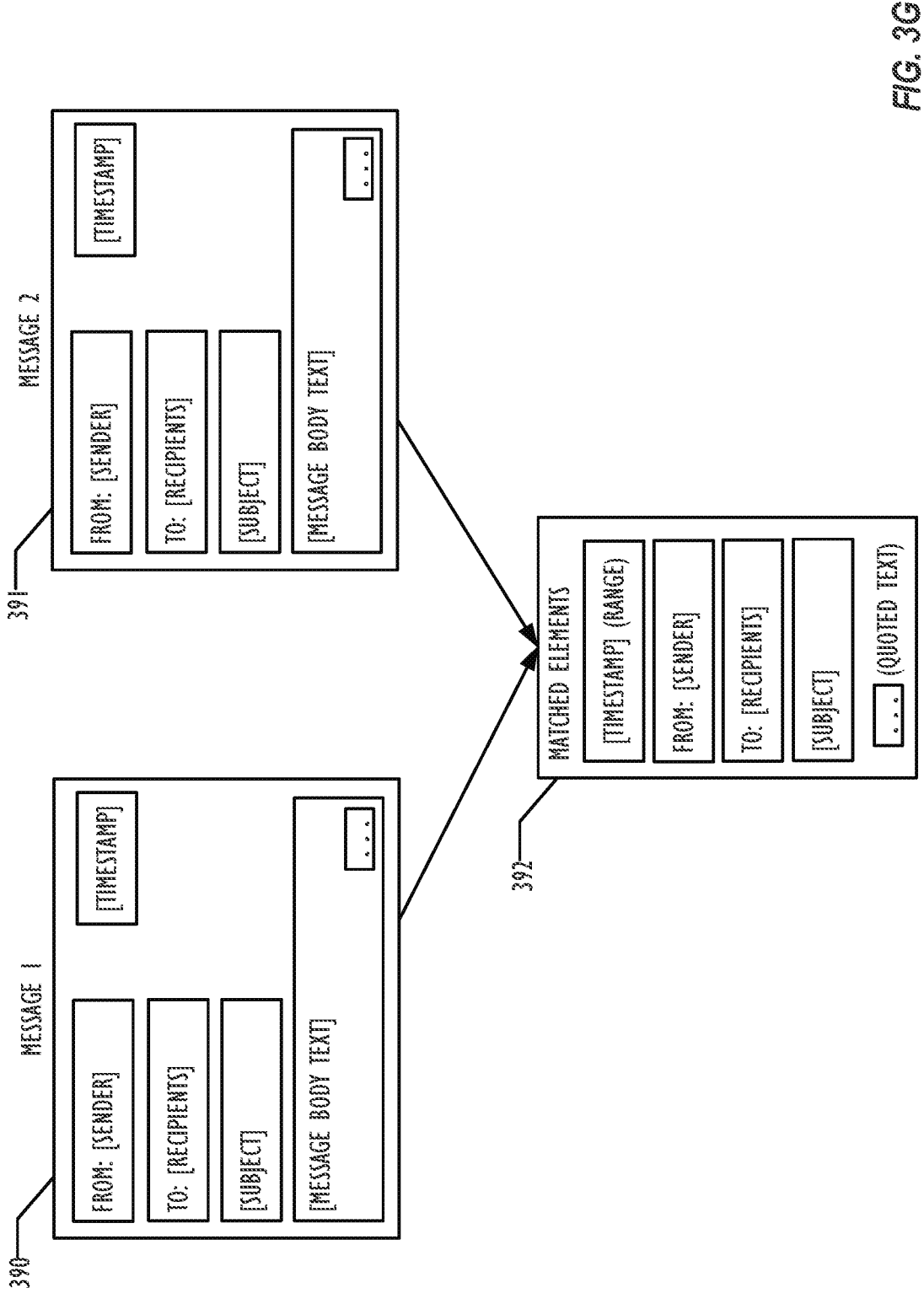
FIG. 3G is an example of element matching for a stitching view mode for a multi-format, multi-protocol communication system, according to one or more disclosed embodiments.

Referring now to FIG. 3G, an example of element matching for a stitching view mode for a multi-format, multi-protocol communication system is shown, according to one or more disclosed embodiments. As mentioned above, element matching may seek to associate otherwise unassociated messages by matching on subject lines, senders/recipient lists, quoted text, etc. Thus, as shown in FIG. 3G, Message 1 390 and Message 2 391 may each include elements such as: a sender, a recipient list, a subject line, a timestamp, and a message body text. The matched elements 392 that the system may determine Message 1 390 and Message 2 391 to have in common may then include, but not be limited to: timestamp (e.g., within a particular range), sender, recipient list (e.g., a certain number of recipients in common), and quoted text (e.g., a certain amount of message body text in common). Based on these matched elements, the system may intelligently determine that Message 1 390 and Message 2 391 are associated with one another and belong as part of the same thread of communication. The messages may thus be displayed in an appropriate and beneficial manner to the user, even if Message 1 390 and Message 2 391 come from vastly different messaging protocols and/or have different formats.

Multi-Format, Multi-Protocol, Communication Indexing and Searching

Figure 4:
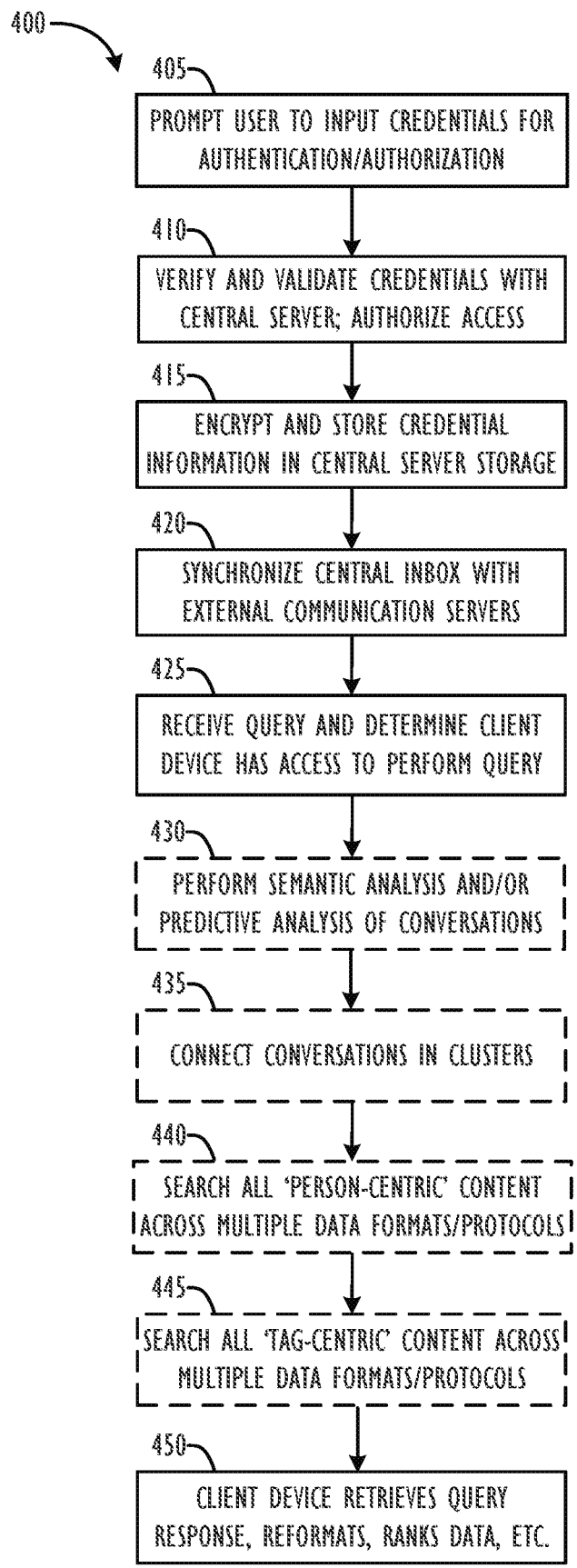
FIG. 4 is a flowchart of one embodiment of a method performing a multi-format, multi-protocol, contextualized communication search, according to one or more disclosed embodiments.

FIG. 4 shows a flowchart 400 of one embodiment of a method of performing a multi-format, multi-protocol, contextualized communication search, according to one or more disclosed embodiments. First, the system may prompt the user to input his or her credentials so that he or she may be authenticated and authorized (Step 405). Next, the sync server 105 and/or third-party servers 106-109 may verify and validate the user's credentials as being authorized to receive communications associated with a particular account(s) tied to a particular messaging service(s) (Step 410). Next, the user's credentials may be encrypted and stored at the sync server 105 so that the user's messages may continue to be retrieved by the system (Step 415). It is to be understood that any suitable authentication framework, such as OAuth, may be used to authenticate the user's credentials and that the credentials need not necessarily be stored at the sync server. Once the user's credentials have been verified and stored, the system may attempt to synchronize the user's multi-protocol, person-centric, multi-format unified messaging inbox feed with the various external communication servers hosting the user's messages from the various third-party messaging services, e.g., by using one or more third-party credentials of the first user stored at the sync server (Step 420). Next, the system may receive a query from a particular user's client device (e.g., to pull new communications directed to the user) and determine that the client device has access to perform the query (Step 425).

Assuming the client device has access, in one embodiment, the query will be sent to a central server(s) of the multi-format, multi-protocol, contextualized communication search system, and, based on the nature of the query, a semantic analysis and/or predictive analysis of the query terms may be performed (Step 430). In such a "server-centric" approach, the central server(s) run search logic through a centralized content database, and the central server(s) may perform real-time relevancy ranking. The results (along with the rankings) may then be sent to the client, so that the client may display the results to a user. This "server-centric" approach may allow for enhanced speed and consistency across clients and services, and may also allow for greater richness in index data modeling. Other query implementations may utilize a more "client-centric" approach. In such a "client centric" approach, a user inputs a query on a client device, and then the client device may run search logic through a client database, allowing the client device to perform real-time relevancy ranking, and display the results on the client device. This option allows for enhanced user privacy, but may sacrifice speed. Still other query implementations may utilize a "hybrid" search architecture, which may comprise a combination of the "server-centric" and "client-centric" approaches outlined above. A "hybrid" architecture may be of particular value when the client device is either not connected to the Internet or when the two databases (i.e., the client database and server database) are not in perfect sync.

As discussed above, a semantic analysis may be performed on extant content on client devices, the system servers, and/or third-party content host servers in order to determine the particular keywords that are relevant and related to the subject matter of a given query(ies), document(s), or communication(s), etc. These keywords may be used to generate a Small Tag Cloud associated with the given query(ies), document(s), or communication(s), etc. These Small Tag Clouds may then themselves be used to generate further Large Tag Clouds based on the particular content of the words in the generated tag cloud, as will be described in further detail below. The Small Tag Clouds and Large Tag Clouds may then be used to "stitch" together, i.e., associate, related query(ies), document(s), or communication(s), etc. into "clusters" (Step 435). In the case of image content, i.e., image content that will be encrypted and not viewable to the server, computer vision-related processes may be run over the image(s) on the client devices to likewise generate Small Tag Clouds for the to-be encrypted images, wherein the Small Tag Clouds may have terms in them related to the predominant content items, objects, themes, etc. discerned in the image by the computer visions-related processes. Analogous computer vision-related techniques may also be applied to create Small Tag Clouds for video content that is to be client-side encrypted, as well.

Once the related query(ies), document(s), or communication(s), etc. have been connected together via the above-described searching process, the user's query may be executed. For example, if the user's query is asking for all content related to a particular second user, the system may search all 'person-centric' content across multiple data formats and/or protocols related to the particular second user (Step 440). For example, if the user clicked on row 308 shown in FIG. 3A, a row which is associated with user 'Peter Ehrmanntraut,' the system could retrieve all the identified emails, video messages, instant messages, voice messages, social media messages, etc. to or from user 'Peter Ehrmanntraut,' resulting in, e.g., the screen 320 from FIG. 3B being displayed on a display screen of the client device of the user that issued the query.

If the user's query is asking for all content related to a particular topic(s) that the user has discussed with user 'Peter Ehrmanntraut,' the system may search all 'tag-centric' content across multiple data formats related to the particular topic(s) (Step 445). For example, if the user typed the term 'book' into search box 326 shown in FIG. 3B, the system could retrieve all the identified emails, video messages, instant messages, voice messages, social media messages, etc. from user 'Peter Ehrmanntraut,' having a tag cloud including the term 'book' or a predictive tag cloud including the term 'book,' resulting in, e.g., the screen 360 from FIG. 3D being displayed on a display screen of the client device of the user that issued the query.

Once all the query-relevant, contextualized multi-format, multi-protocol data has been located by the server, packaged, and then sent to the client device issuing the query, the client device retrieves the information, reformats it (if applicable), ranks or sorts it (if applicable), and displays the information on a display screen of the client device (Step 450). As will be discussed in further detail below in reference to FIGS. 6-7, the use of these intelligent, dynamic tag clouds to index documents and/or communications may enable the server to provide relevant search results, even including documents that are fully client-side encrypted that the server does not have access to or the ability to decrypt.

Figure 5A:
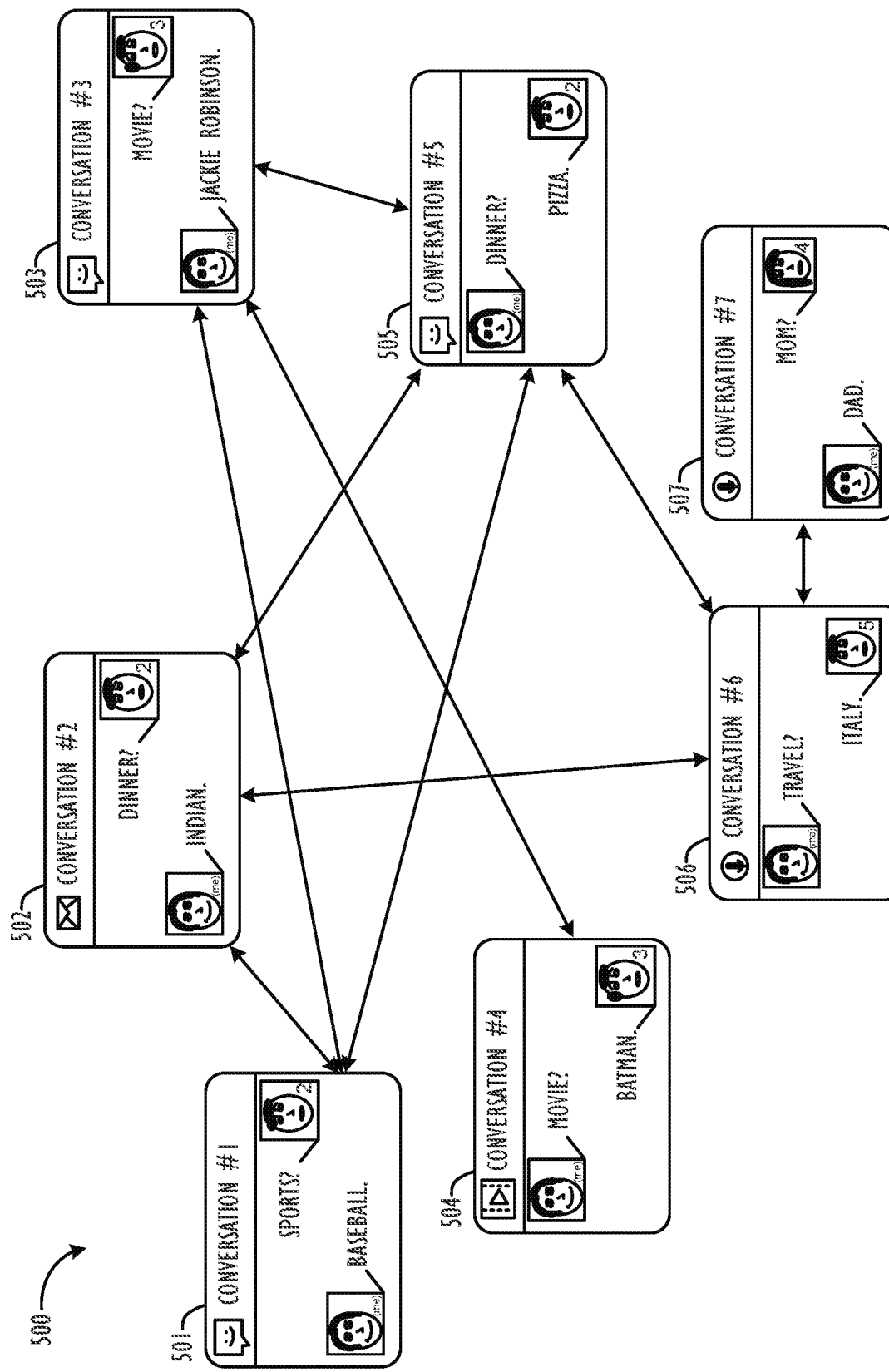
FIG. 5A is an example of communications clustering, according to one or more disclosed embodiments.

FIG. 5A shows an example of communications clustering 500, according to one or more disclosed embodiments. Exemplary communications clusters 500 are comprised of seven individual conversations, 501-507. For example, Conversation #1 501 comprises an instant messaging conversation between the user of the client device (appearing on the left-hand side of the conversation box) and user 'Peter Ehrmanntraut' (appearing on the right-hand side of the conversation box). Conversation #1 appears to be a conversation about sports generally, and baseball in particular. Conversation #2 502 comprises an email conversation that is also between the user of the client device (appearing on the left-hand side of the conversation box) and user 'Peter Ehrmanntraut' (appearing on the right-hand side of the conversation box). Conversation #2 appears to be a conversation about dinner generally, and Indian food in particular. Conversation #3 503 comprises an instant messaging conversation between the user of the client device (appearing on the left-hand side of the conversation box) and user 'Bob Withers' (appearing on the right-hand side of the conversation box). Conversation #3 appears to be a conversation about movies generally, and a movie about Jackie Robinson in particular. Conversation #4 504 comprises a video message conversation between the user of the client device (appearing on the left-hand side of the conversation box) and user 'Bob Withers' (appearing on the right-hand side of the conversation box). Conversation #4 appears to be a conversation about movies generally, and Batman in particular. Conversation #5 505 comprises an instant messaging conversation between the user of the client device (appearing on the left-hand side of the conversation box) and user 'Peter Ehrmanntraut' (appearing on the right-hand side of the conversation box). Conversation #5 appears to be a conversation about dinner generally, and pizza in particular. Conversation #6 506 comprises a voice message conversation between the user of the client device (appearing on the left-hand side of the conversation box) and user 'Joe Dawson Withers' (appearing on the right-hand side of the conversation box). Conversation #6 appears to be a conversation about travel generally, and Italy in particular. Finally, Conversation #7 507 comprises a voice message conversation between the user of the client device (appearing on the left-hand side of the conversation box) and another user (appearing on the right-hand side of the conversation box), who, in this case, may not be a current contact of the user of the client device. Conversation #7 appears to be a conversation about family generally, and moms and dads in particular. Note that, to attain semantic contextual information from communications in certain data formats (e.g., video or voice), an intermediary transcription step may be required to convert the audio content of the message into textual content that may be indexed, semantically and predictively analyzed, and, ultimately, clustered and searched upon.

Various conversations in FIG. 5A are shown as being "correlated" or "clustered" together, as represented by the bi-directional arrows connecting the various conversation boxes. "Correlating" or "clustering" may be used to connect conversations in a richer and more contextual fashion than is provided by a simple linear interface (i.e., message, reply, surreply, etc.). Some of the conversations in FIG. 5A appear clustered for obvious reasons, but others are clustered for more subtle contextual and semantic reasons. For example, Conversation #1 501 is stitched together with Conversation #2 502 and Conversation #5 505 because the other party to the conversation, 'Peter Ehrmanntraut,' is in common among each conversation. Conversation #1 501 is stitched together with Conversation #3 503, however, because of a similarity in message protocol, i.e., both conversations are in an instant messaging protocol and because of a similarity in content, i.e., baseball and Jackie Robinson may be deemed by the system to be semantically related topics. It is to be understood that, based upon the query, certain communications that are clustered together may be excluded from the query. For example, even though Conversation #1 501 and Conversation #3 503 are clustered together, if the search query is for all content related to user 'Peter Ehrmanntraut,' then Conversation #3 503 may not be returned by the query since its only link to Conversation #1 501 was based on protocol type and subject matter content.

Moving on to Conversation #2 502, it is further clustered with Conversation #6 506 based on the fact that each conversation mentions a country (India,' in the case of Conversation #2 502, and 'Italy' in the case of Conversation #6 506), and these tags have been predictively semantically linked with one another in the example shown in FIG. 5A, perhaps because they both relate to potential travel destinations, potential food categories, or the like. Conversation #2 502, is further clustered with Conversation #5 505 based on the fact that each conversation relates to the topic of dinner.

Moving on to Conversation #3 503, it is further clustered with Conversation #4 504 based on the fact that each conversation mentions a movie (Jackie Robinson,' in the case of Conversation #3 503, and 'Batman' in the case of Conversation #4 504), and these tags have been predictively semantically linked with one another in the example shown in FIG. 5A. Conversation ## 503, is further clustered with Conversation #5 505 based on the fact that each conversation is in instant messaging format.

Moving on to Conversation #5 505, it is further clustered with Conversation #6 506 based on the fact that each conversation mentions a topic that has been semantically linked to the concept of 'Italy' (pizza,' in the case of Conversation #5 505, and the word 'Italy' itself in the case of Conversation #6 506).

Finally, Conversation #6 506, is further clustered with Conversation #7 507 based on the fact that each conversation is in a video messaging format.

It is to be understood that similar "correlation"/"clustering" techniques may be applied to the documents or files based on their semantic content (e.g., as represented in tag clouds), file type and/or other properties. As will be discussed in further detail below in reference to FIGS. 6-7, the use of tag clouds to index documents or files may enable the server to correlate documents or files having similar content together with one another, even though the server may not have access to the encrypted content of such documents or files—thus allowing for more relevant search results to be returned by the server without violating the integrity of the confidentiality of the client's encrypted data.

Figure 5B:
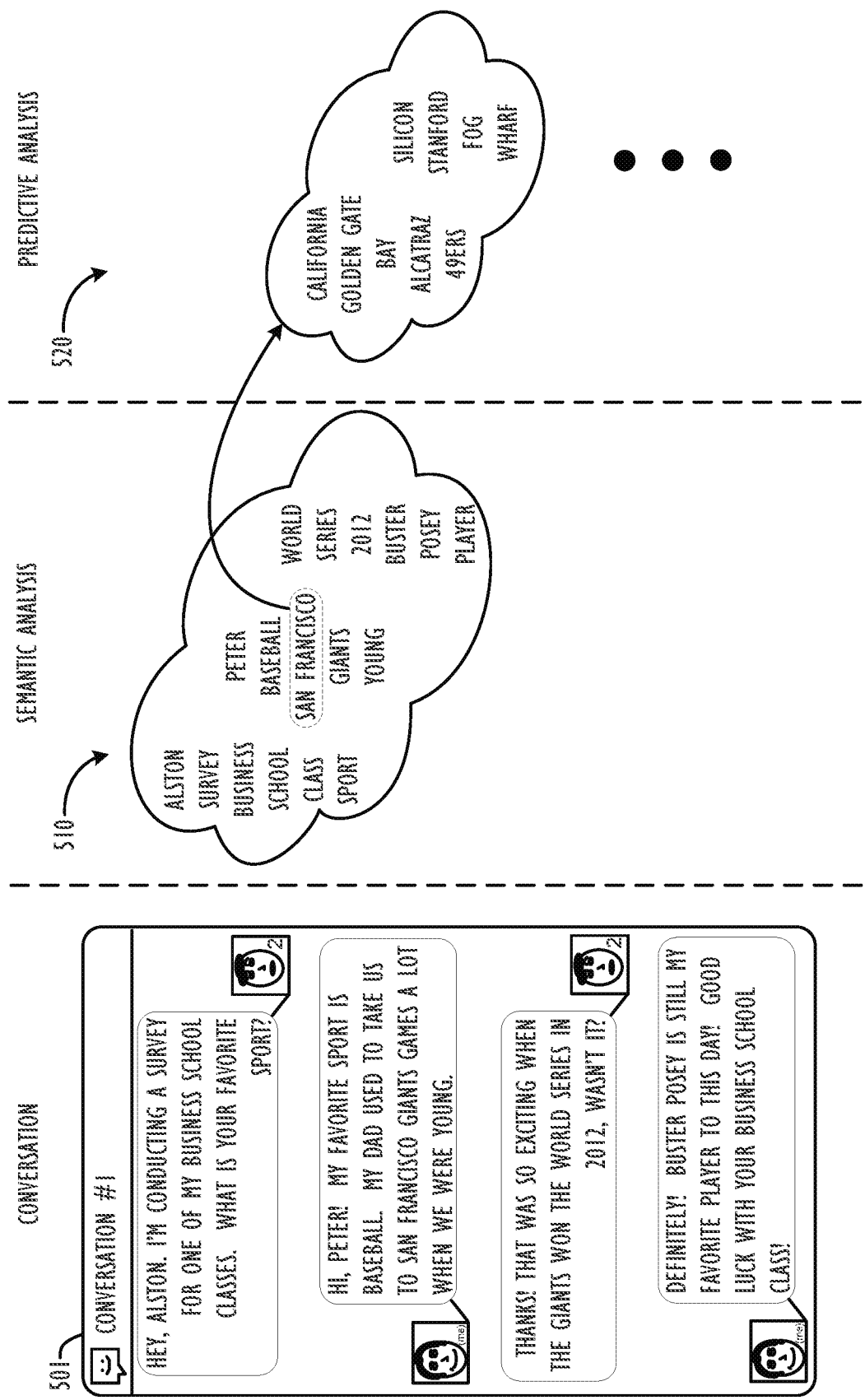
FIG. 5B is an example of communications semantic analysis and predictive analysis, according to one or more disclosed embodiments.

FIG. 5B shows an example of communications semantic analysis and predictive analysis, according to one or more disclosed embodiments. Beginning on the left-hand side of FIG. 5B, an expanded view of Conversation #1 501 is shown. Based on a semantic analysis of the content of Conversation #1 501, the "initial tag cloud" or Small Tag Cloud 510 for the conversation has been generated, comprising the keywords relating to the main semantic topics expressed in Conversation #1 501. As may be seen, tag cloud 510 comprises mainly nouns, including names, dates, places, and proper nouns. Less important words and connective words, such as "a," "for," "my," "what," "is," etc. are not deemed semantically important enough to be included in tag cloud 510 representing the content of Conversation #1 501.

Based off each word in tag cloud 510, and additional predictive analysis may be performed, resulting in "predictive tag cloud" or Large Tag Cloud 520. In the example of FIG. 5B, only the portion of the "predictive tag cloud" for Conversation #1 related to the word "San Francisco" is shown for illustrative purposes. In some embodiments, the "predictive tag cloud" or Large Tag Cloud for Conversation #1 may further comprise similar predictive tag cloud portions for each of the words/concepts in the Small Tag Cloud for the given Conversation. It is to be understood, then, that the Large Tag Cloud may comprise several times as many words/concepts as the Small Tag Cloud for a given conversation, document, or communication. The predictive tag clouds may be used by the system to stitch together conversations, documents, or communications that a user may not have even considered to be relevant to his or her query (or encrypted documents, for which the server would not otherwise have any content-based knowledge), thus revealing additional potential business and/or personal value to the user.

As the centralized messaging database grows, it will become possible for the system to rely more and more on its own data to drive the initial tag cloud and predictive tag cloud algorithms. For example, if a particular user always begins emails with, "Hope you're doing well," the system could determine that it was not necessary to repeatedly index that phrase, and instead simply keep a note of a reference to the original phrase. This process of contextual learning may be employed for an individual user's content, as well as across global content stored in the centralized messaging database (e.g., the world may say, "Congratulations on the new baby!" phrase quite often). This process may allow for less duplication, smaller index sizes, better compression density, etc.

Further, contextual learning may be used to determine that a particular user has recently started to use one phrase in place of another, e.g., if the user just spent a year living in London, he or she may start to use the phrase "to let" instead of "for rent." In such a situation, a machine learning system using contextual cues could determine that, for that the particular user only, the phrases "to let" and "for rent" are considered like terms and, therefore, would share word mapping, perhaps even only for a specific period of time should the same contextual clues change later (e.g., the 3 months that user was traveling abroad). This way, when the user searches for the index search term "rent," the system can include references to "let" as potentially relevant matches. Another machine learning technique(s) that may be employed include techniques to influence index search parameters, e.g., by weight assignment. For example, a particular user's searches and/or activity pattern may indicate that historic "time" is not a significant search parameter for the user. In other words, the particular user may only really interact with and search for content within a one-week timeframe of the present date. The centralized system could monitor such behaviors and adjust the index search parameter weights at regular or semi-regular intervals accordingly to assign greater weight to the timestamp on recent content and reduce the weight when timestamps are "old" for that particular user, thus allowing the system to provide a more customized and relevant search experience. By employing these customized contextual learning techniques, the end result is that the same content, e.g., an email sent from User A to User B, could have two different index search term mappings in the centralized system so that both User A and User B can have an independently optimized search/threading experience. The system could also perform machine-learning techniques based on historic patterns of communication to influence predictive threading. For example, in protocols where data is limited, e.g., SMS, the system could employ a historic look-back on the User's communication in order to determine the likelihood of a conversation to/from the User pervading across multiple protocols. That assigned weight pertaining to the likelihood of a conversation 'jumping' protocol could then impact the stitching results for that User. An example of this could be the situation where User A receives an email from User B, and User B then follows-up via SMS to request confirmation of receipt of the email by User A. Semantic analysis of these conversations can reveal the connection between the single SMS message and the corresponding email message—even though no formal tie exists in the message or metadata. In this way, the system is able to apply machine-learning techniques on an individual level in order to provide the most relevant search results to the user across formats and protocols.

Figure 5C:
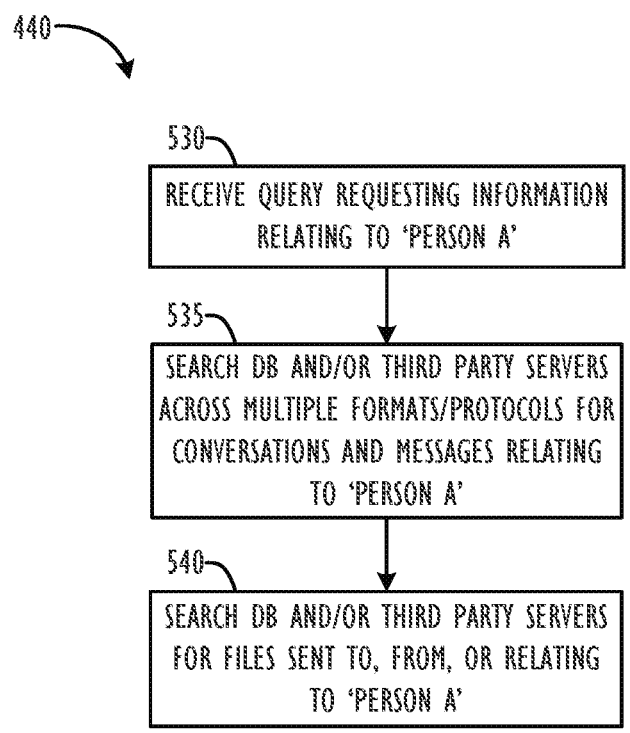
FIG. 5C is a flowchart of one embodiment of a method for performing a "person-centric" content search across multiple data formats and/or protocols, according to one or more disclosed embodiments.

FIG. 5C is a flowchart of one embodiment of a method for performing a "person-centric" content search across multiple data formats and/or protocols, according to one or more disclosed embodiments. The flowchart in FIG. 5C is labeled 440 to indicate that it represents a more detailed build out of Step 440 in the flowchart of FIG. 4. First, the system may receive a query requesting information relating to another particular person, 'Person A' (Step 530). Next, the system may search its database(s) and/or the relevant third-party host servers across multiple data protocols and formats for conversations, messages, etc. relating to 'Person A' (Step 535). The search may return messages sent to or from 'Person A,' as well as messages that mention 'Person A,' or even messages that mention businesses, acquaintances, or interests, etc. that are associated with 'Person A.' Next, the system may search its database(s) and/or the relevant third-party host servers across multiple data protocols and formats for documents relating to 'Person A' (Step 540). As with the conversation-focused search, the document-focused search may return documents sent to or from 'Person A,' as well as documents created by or for 'Person A', or documents that mention 'Person A,' or even documents that mention businesses, acquaintances, or interests, etc. that are associated with 'Person A.' The results of "person-centric" content search may then be packaged and returned to the client device as appropriate.

Figure 5D:
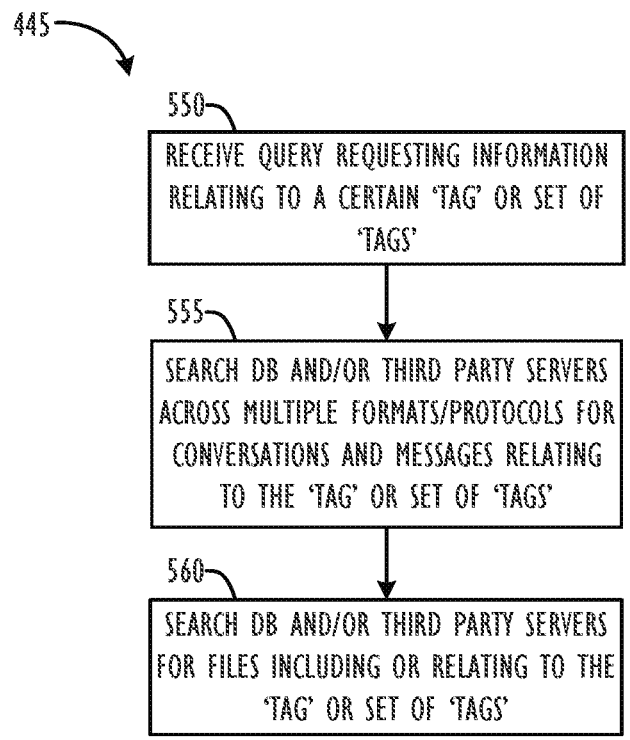
FIG. 5D is a flowchart of one embodiment of a method for performing a "tag-centric" content search across multiple data formats and/or protocols, according to one or more disclosed embodiments.

FIG. 5D is a flowchart of one embodiment of a method for performing a "tag-centric" content search across multiple data formats and/or protocols, according to one or more disclosed embodiments. The flowchart in FIG. 5D is labeled 445 to indicate that it represents a more detailed build out of Step 445 in the flowchart of FIG. 4. First, the system may receive a query requesting information relating to a particular tag or set of tags, e.g., tag clouds 510 or 520 discussed above with respect to FIG. 5B (Step 550). Next, the system may search its database(s) and/or the relevant third-party host servers across multiple data protocols and formats for conversations, messages, etc. relating to the particular tag or set of tags (Step 555). Next, the system may search its database(s) and/or the relevant third-party host servers across multiple data protocols and formats for documents relating to the particular tag or set of tags (Step 560). The results of "tag-centric" content search may then be packaged and returned to the client device as appropriate. As may now be understood, certain user queries may be only "person-centric," others may be only "tag-centric," while still other queries may combine elements of both "person-centric" and "tag-centric" searching.

Figure 6:
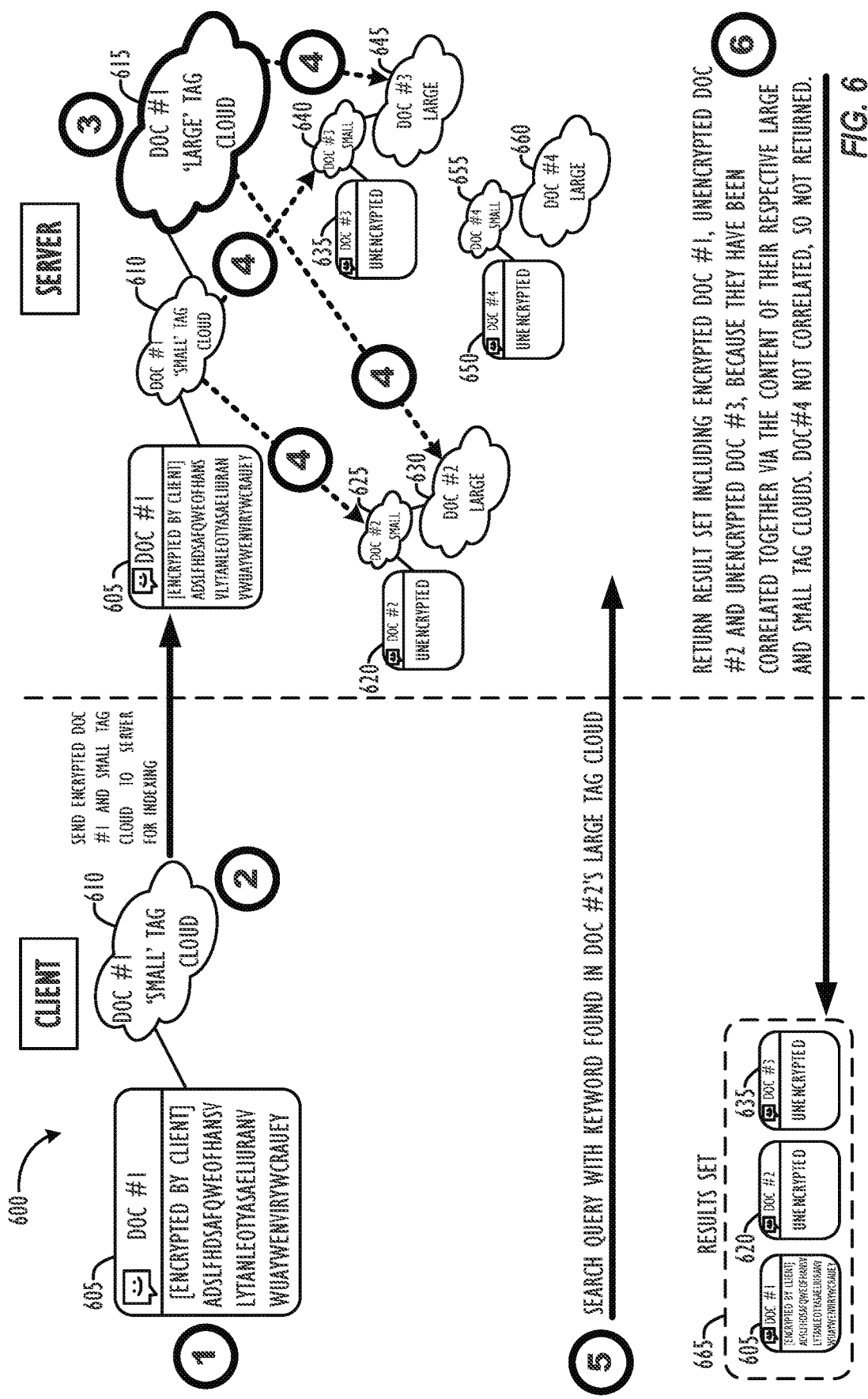
FIG. 6 is an example of performing dynamic, encrypted server-side searching, according to one or more disclosed embodiments.

FIG. 6 shows an example 600 of performing dynamic, encrypted server-side searching, according to one or more disclosed embodiments. In this example, starting near the encircled number 1, an exemplary document, DOC #1 (605) is created, encrypted, and stored at a client device. The content inside DOC #1 (605) is shown as garbled text to represent the fact that the underlying content is client-side encrypted, and thus not visible or discernable to the server (or any other recipient that does not possess that correct decryption key). Next, as shown near the encircled number 2, the client may generate an "initial tag cloud" or Small Tag Cloud (610) related to the underlying content of DOC #1 (605). The terms that are selected for the "initial tag cloud" are generated using language processing models and are intended to represent the important semantic and/or content-based topics found in the underlying document. In some embodiments, the user of the client device may even be presented with the list of terms in the generated "initial tag cloud" and given the option to add/modify/remove particular terms from the "initial tag cloud" before sending the initial tag cloud to a server (or any other third party), so as to create a "user-customized" initial tag cloud index. For example, in a bank statement document, a user's Account Number may occur enough times in the document that the Account Number is included as a term in the initial tag cloud, however, the user may not wish for his Account Number to be sent to the server as a part of the initial tag cloud (even though the underlying document itself will be encrypted), thus, he may choose to manually remove his Account Number from the initial tag cloud before proceeding to send the tag cloud off device.

Next, the encrypted DOC #1 (605) and the generated Small Tag Cloud (610) may be sent to a server device for further processing. In particular, as shown near the encircled number 3, the server may generate a "predictive tag cloud" or Large Tag Cloud (615), e.g., using Markovian data models and/or semantic language training techniques. For example, words like "restaurant" in the Small Tag Cloud may predictively generate words like "café," "diner," etc. in the "large tag cloud." Because the server cannot see the content of DOC #1, the words in the predictive tag cloud or Large Tag Cloud are not necessarily in the underlying document, but rather are an educated guess (based on the aforementioned data models and training) of a topic or concept found in the content of the encrypted document. In other embodiments, the Large Tag Cloud may be generated on a client device and then sent to the server device, rather than being generated on the server device.

As shown near the encircled number 4's in FIG. 6, the server may use the tag clouds of the documents it is already storing, in addition to the generated Small Tag Cloud (610) to create or augment a Large Tag Cloud (615) for DOC #1. More particularly, the server may correlate the incoming encrypted document (in this case, DOC #1) with other stored documents whose tag clouds indicate a subject matter overlap with incoming small tag cloud of DOC #1. In this example, DOC #2 (620), having small tag cloud (625) and large tag cloud (630), as well as DOC #3 (635), having small tag cloud (640) and large tag cloud (645) are correlated with incoming encrypted DOC #1, as indicated by the dashed line arrows connecting the tag clouds of DOC #1 to DOC #2 and DOC #3. In this example, DOC #4 (650), having small tag cloud (655) and large tag cloud (660), is not correlated with incoming encrypted DOC #1, e.g., because there may not have been enough semantic overlap between the terms in small tag cloud (610) and the terms in tag clouds 655 and 660 associated with DOC #4.

According to some embodiments, both the "small" and "large" tag clouds of the incoming encrypted document may be correlated with the "small" and "large" tag clouds of any of the matching documents stored on the server. In some cases, the "small" tag clouds of the unencrypted documents stored at the server may be generated by the server if they were not already generated by a client/owner of the document before upload to the server. In general, the correlation process may begin by connecting the small tag cloud of the encrypted incoming document to the small tag clouds of the stored unencrypted documents (as similarity between small tag clouds is more likely to indicate an actual similarity in content between documents than similarity between large, i.e., predictive, tag clouds), and then the correlation process may link out to the large tag clouds of the documents that were a small tag cloud match.

Once the correlated documents have been located at the server, the incoming encrypted document may then use the terms from the large (and small) tag clouds of the correlated unencrypted documents in order to enhance and increase the relevancy of the incoming encrypted document in search results. There are several ways in which the encrypted document can "inherit" from the tag clouds of the correlated documents in order to augment its own tag cloud. In one embodiment, the large tag cloud (615) of the incoming encrypted document could actually be 'infused' with the tags of the correlated documents, that is, have the tags of the correlated documents actually added into the large tag cloud (615) of the incoming encrypted document. In another embodiment, the incoming encrypted document could simply be 'linked' to the correlated documents, that is, any time a user or client runs a search query that would return one of the correlated documents, the server could also return the incoming encrypted document, as it would also be a likely relevant search result for that search query since it has been deemed to have similar content.

According to some embodiments, each time that a document is updated by a user, the client may re-generate a set of updated tags for a small tag cloud that is relevant for that document in its updated state, and the correlation process outlined above may be repeated. Thus, the tag clouds for the encrypted document are kept up to date over time. Tracking pattern changes in tag clouds over time between documents (e.g., tag clouds growing in size over time) may also provide further indication that two documents should be correlated with one another.

Moving down to the encircled number 5 in FIG. 6, in this example, the user searches for documents using a keyword that is found in DOC #2's large tag cloud. As described above, the results set for the search may include DOC #2, as well as DOC #1 and DOC #3, which, in this example, were also previously correlated together based on the content of their respective large and/or small tag clouds. Notice that, based on the aforementioned tag cloud correlation process, the server is able to return DOC #1 as a likely relevant search result to this query even though it has no ability to see the internal content of encrypted DOC #1. Thus, finally, near the encircled number 6, the result set (665) comprising DOC #1 (605), DOC #2 (620), and DOC #3 (635) are returned to the client. The goal of the server in this example is to deliver to the client the subset of documents that it believes is worthwhile for the client to individually review in order to see if the result set includes the document that the client is actually looking for. There is always a chance that the search doesn't return the correct document, but this is simply a tradeoff with the enhanced privacy that is maintained by the user's documents, communications, etc. remaining encrypted to the server.

Other types of metadata information available to the server with regard to encrypted documents, e.g., the size of document, the duration of time for which the document has been modified, the document's file name, etc. may also be used as additional insight into other documents that may be correlated with the incoming encrypted document. For example, the quarterly financial reports for a given user may all be Excel docs of similar sizes with similar properties, "FY" in the file name, etc., and this information may be used to augment the tag cloud of an incoming encrypted document that has properties making it look like a potential financial report. For example, by correlating the incoming encrypted 'suspected' financial report document with the tag clouds of other unencrypted Excel files having similar metadata properties (and thus 'infusing' the tag clouds of the incoming encrypted 'suspected' financial report with the tags from the tag clouds of the known, unencrypted financial reports already stored at the server), the ability for the server to return the incoming encrypted document in relevant search result sets may be greatly enhanced—even though the actual content of the encrypted document remains unknown to the server.

It is to be understood, that while this example contemplates a "server" doing the analysis and correlation between tag clouds, in other embodiments, it could be any device performing the analysis and correlation functionality. One potential benefit of allowing a server to do the analysis and correlation and generate the search results is that it allows the clients to maintain low power draws, and thus makes searching across multi-devices efficient, which is especially important in battery-powered client devices, such as mobile phones, tablets, laptops, etc.

Figure 7:
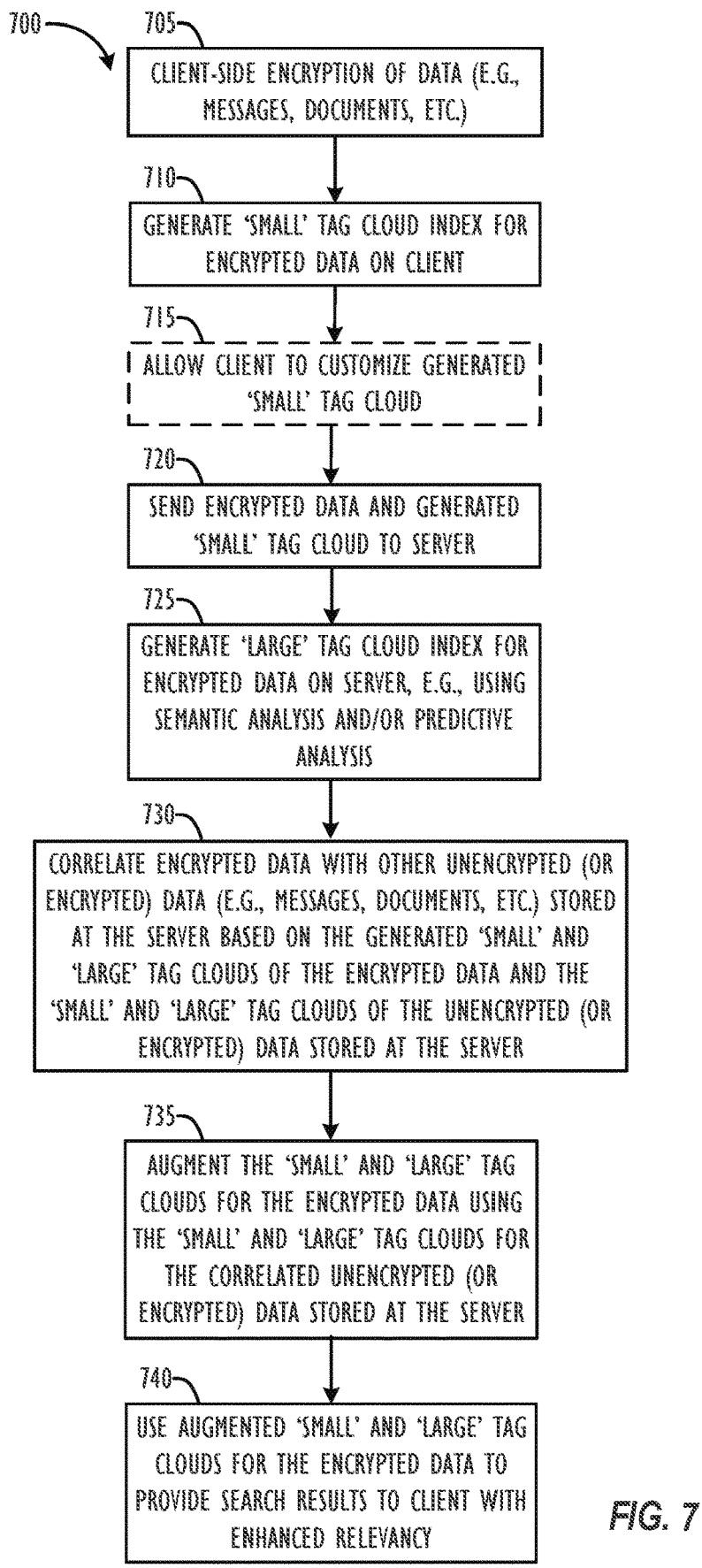
FIG. 7 is a flowchart of one embodiment of a method for performing dynamic, encrypted server-side searching, according to one or more disclosed embodiments.

FIG. 7 is a flowchart of one embodiment of a method 700 for performing dynamic, encrypted server-side searching. First, at Step 705, the client-side encryption of the relevant data (e.g., messages, documents, etc.) is performed. Next, at Step 710, the client may generate an appropriate Small Tag Cloud index for the encrypted data, e.g., based on semantic analysis and/or other learned language models. Optionally, at Step 715, the client may be given the opportunity to customize the generated "small tag cloud," e.g., by adding/editing/removing one or more of the generated tags. Next, at Step 720, the client may send the encrypted data and the generated small tag cloud index to a server. Next, at Step 725, the server may generate an initial "predictive tag cloud" or Large Tag Cloud for the encrypted data using, e.g., semantic analysis and/or predictive analysis of the terms in the small tag cloud. At Step 730, the server may undertake a correlation process to correlate the encrypted data with other unencrypted (and/or encrypted) data stored at the server based on the "small" and "large" tag clouds of the encrypted data and the "small" and "large" tag clouds of the unencrypted (and/or encrypted) data. According to some embodiments, the process may also other users' documents to help generate the Large Tag Clouds and/or to enhance the relevancy of search results including client-side encrypted content. Of course, subsequent searches would not actually search through the other user's documents when the search is actually executed (unless such permission was given by the other users), nor would they be returned in the results set (again, unless such permission was given by the other users). The other users' documents' tag clouds may could simply be used to increase the likely relevancy of the Large Tag Cloud of the user in question's encrypted data.

In some embodiments, the Small Tag Clouds are used to make the initial correlation between the encrypted data and the unencrypted (and/or encrypted) data stored at the server, and then the Large Tag Cloud of the encrypted data may be augmented (Step 735) with the data from the Large (and Small) Tag Clouds of the correlated unencrypted data, thus increasing the relevancy of the tag clouds of the encrypted data—without the server ever actually decrypting the data or performing an analysis on the content of the underlying data. Finally, at Step 740, the server may use the augmented small and/or large tag clouds for the encrypted data to provide search results to the client with enhanced relevancy—even returning client-side encrypted documents in appropriate circumstances.

Figure 8:
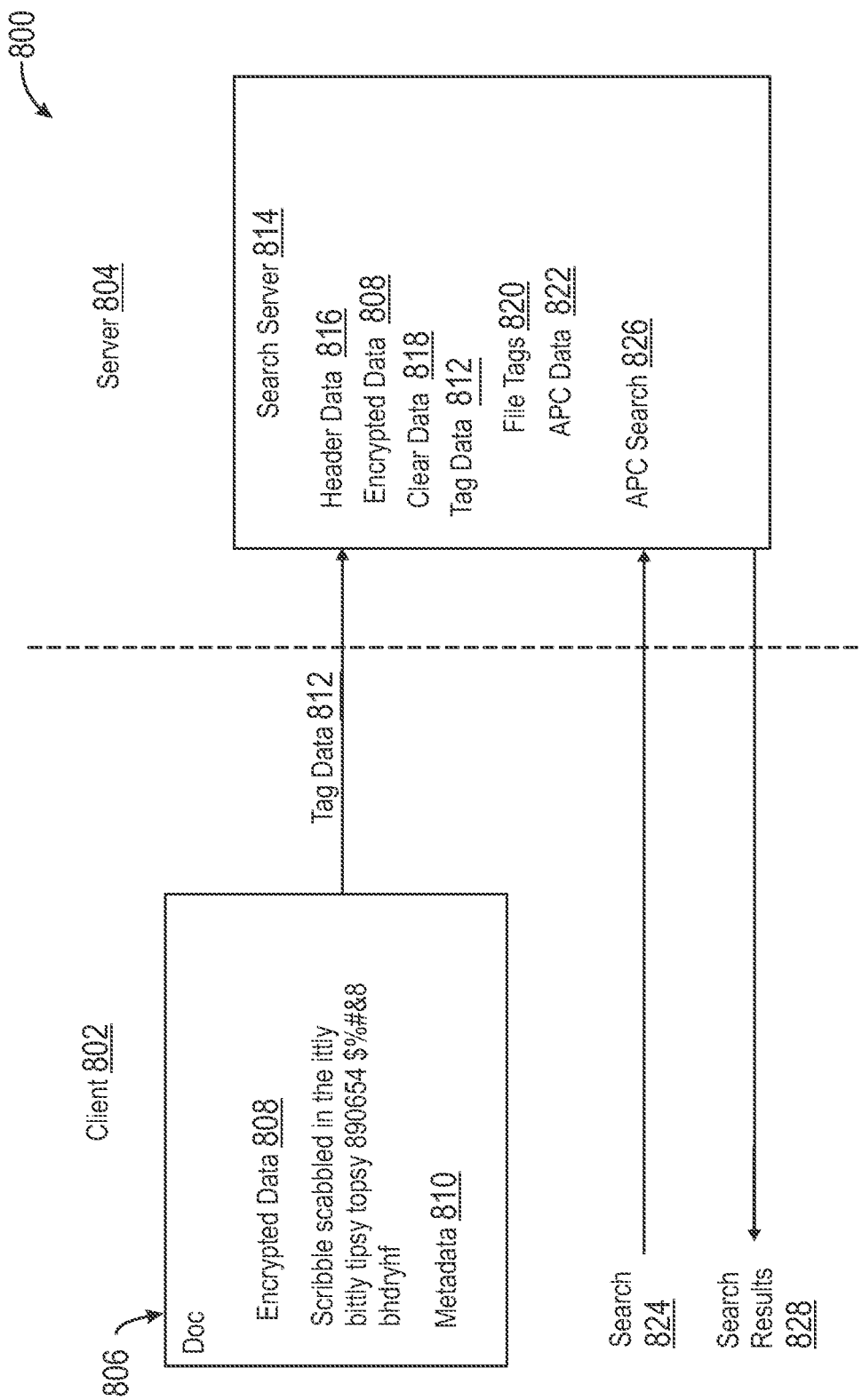
FIG. 8 is an example of indexing, correlating, and searching documents having encrypted data from an adaptive privacy control, according to one or more disclosed embodiments.

FIG. 8 is an example 800 of indexing, correlating, and searching documents having encrypted data from an adaptive privacy control, according to one or more disclosed embodiments. In example 800, a client 802 may interact with a server 804 in order to perform indexing and searching of a document that includes encrypted and/or hidden data based on one or more privacy controls, such as adaptive privacy controls (APCs). With APCs, a file, such as a document having one or more regions or portions of data, may be configured with different privacy controls and layers. Each layer for the document may encrypt data from the portion(s) of data in the document and may limit what may be viewed in clear text or data in the document. Further, the file may have header or footer data, which includes metadata associated with the underlying clear text and/or clear data, data associated with encrypted or otherwise provide APC layers and hidden data in the file, and the like. With APCs, a file may include different layers that may be associated with the availability of data to be viewed by different users, devices, servers, regions, or other entities when the file is opened, indexed, processed, and/or searched. For example, an APC may limit certain data from being viewed by an employer but not an authorized user, such as a family member, friend, client, medical personnel, or other designated entity when the file is opened.

With APCs, different bits or regions of an image may be encrypted and/or hidden without corrupting the underlying image and/or file. For example, a user's facial image in a larger image may be hidden to prevent revealing of the user with an APC. However, authorized users may be capable of viewing that user's image. When utilizing files having APCs, difficulty searching may occur, such as when the image may not be searchable based on corresponding bits and regions that may confuse search engines and/or cause incorrect searching. However, APCs may not modify or alter the underlying file and may instead add privacy controls and/or layers to data within a file without corrupting the underlying file. In this regard, in example 802, client 802 may perform indexing and allow for searching of APC protected files with server 804 through the use of tags for data, files, documents, and metadata generated using an AI engine. Thus, in order to allow for indexing and searching, client 802 may provide data necessary for the AI engine, such as a machine-learning engine using one or more machine-learning models, to generate tags of certain clear data, encrypted data, and/or metadata, which then allows for indexing of files having APC protected data and searching of such indexed files using file or document descriptions resulting from correlations generated from the files' or documents' tags and other files or documents having corresponding tags.

In example 800, initially client 802 obtains and/or provides a document 806, which includes encrypted data 808 resulting from an APC process or component used to encrypt or hide certain data in document 806. Document 806 may further include metadata 810, and may further include clear text or data in further embodiments. For example, clear text may include unencrypted text in a document, whereas clear data may include image data that has not had pixels or other image data obscured, blurred, encrypted, or otherwise hidden using an APC. Client 802 may provide the data for document 806 to server 804, as well as any APC settings and/or privacy preservice process to encrypt and/or hide data in document 806 (e.g., encrypted data 808). The data provided to server 804 may include tag data 812 for one or more tags to be generated using an AI system for document 806, which may then be used for indexing and/or searching of document 806 after application of APCs to different portions and/or regions of data in document 806.

Thereafter, a search server 814 of server 804 may execute one or more AI operations and/or engines to generate AI descriptive tags of tag data 812 for document 806. Search server 814 may initially utilize one or more AI operations to generate these descriptive tags, such as by intelligently correlating the data and/or providing description or predictive tags that may be used by search engines to describe or relate the tagged data to other tagged data based on the tags. The AI descriptive tags may correspond to file tags 820, which may be based on header data 816, encrypted data 808, clear data 818, and/or other data from tag data 812. For example, file tags 820 may include tags for content in document 806 including names on faces, sentiment on content, etc. In some embodiments, such as for a not safe for work (NSFW) system, search server 814 may communicate with an external registry of known content (flagged) or other any other task to generate file tags 820 and notify another communication end point (person or machine) or the potentially NSFW material. This allows for detection, flagging, and protection from a breach of data permissions in a larger file, a use or transmission of NSFW material, and the like based on file tags 820. Further, this may also protect from fraud and/or misappropriation of sensitive, secure, or confidential material when transmitted, indexed, and/or searched.

Search server 814 may therefore receive and process document 806 with one or more other documents and an AI descriptive tagging operation in order to generate file tags 820. File tags 820 may be generated by correlating portions of and/or data in certain areas and/or regions of document 806 with other documents (e.g., a second set, list, or database of searchable documents that may include other tags and/or data portions) using an AI engine for descriptive tagging in an intelligent manner, such as through one or more trained machine-learning models and/or engines. In this regard, correlations may be generated of such tags and documents, and a document description may be output, such as to describe document 806 and/or during a search of document 806. Generating of file tags 820 may be performed using header data 816 found in a header or footer of document 806, which may describe and/or provide information about the underlying data, creation and/or editing of, and/or otherwise altering document 806. Further, encrypted data 808 and/or clear data 818 may be used to generate tags by correlating such encrypted and/or clear data with other same or similar encrypted and/or clear data and generating tags that describe such data. Document 806 may then be protected based on APC data 822, which may correspond to one or more APC controlled or protected regions, data portions, or the like within document 806.

Thus, document 806 may then become associated with AI generated tags and metadata. File tags 820 may then include one or more pre-encryption tags, which are then applied. File tags 820 may include data designating a region that may be selected by user action or automatic region selection from APC data 822, which is then used to encrypt, hide data from, and/or protect corresponding regions in document 806 that are APC protected (e.g., by correlating file tags 820 to such regions that are then protected). Search server 814 may then link file tags 820 to the corresponding selected region(s) and/or portion(s) for APC data 822. Any tag bound to that region may then be a part of the space for document 806. Further, each region may include pixels, data, text, etc., for the corresponding data region. This may provide an encryption server that correlates regions with AI metadata and tags as a single or small bit object for that APC protected region. Once APC is used for APC data 822, an APC embed function may then concatenate the original source of document 806 with the encrypted payload for encrypted data 808.

Thereafter, a search 824 may be requested by client 802, which may be processed by search server 814 using an APC search 826. APC search 826 may include a read operation to read, index, and/or search APC payload using file tags 820. Thus, APC payloads having encrypted data 808 in document 806 may be searched using an APC parser that may assist in reading the added AI metadata and/or meta objects for file tags 820. Search results 828 may then be provided back to client 802 by server 804 in response to search 824 when executing APC search 826 performed at least using file tags 820. This allows for searching of APC protected images, videos, audio, documents, text, sets of frames including compressed data, and/or combined documents or files with embedding images, video, audio, text, and the like.

Figure 9:
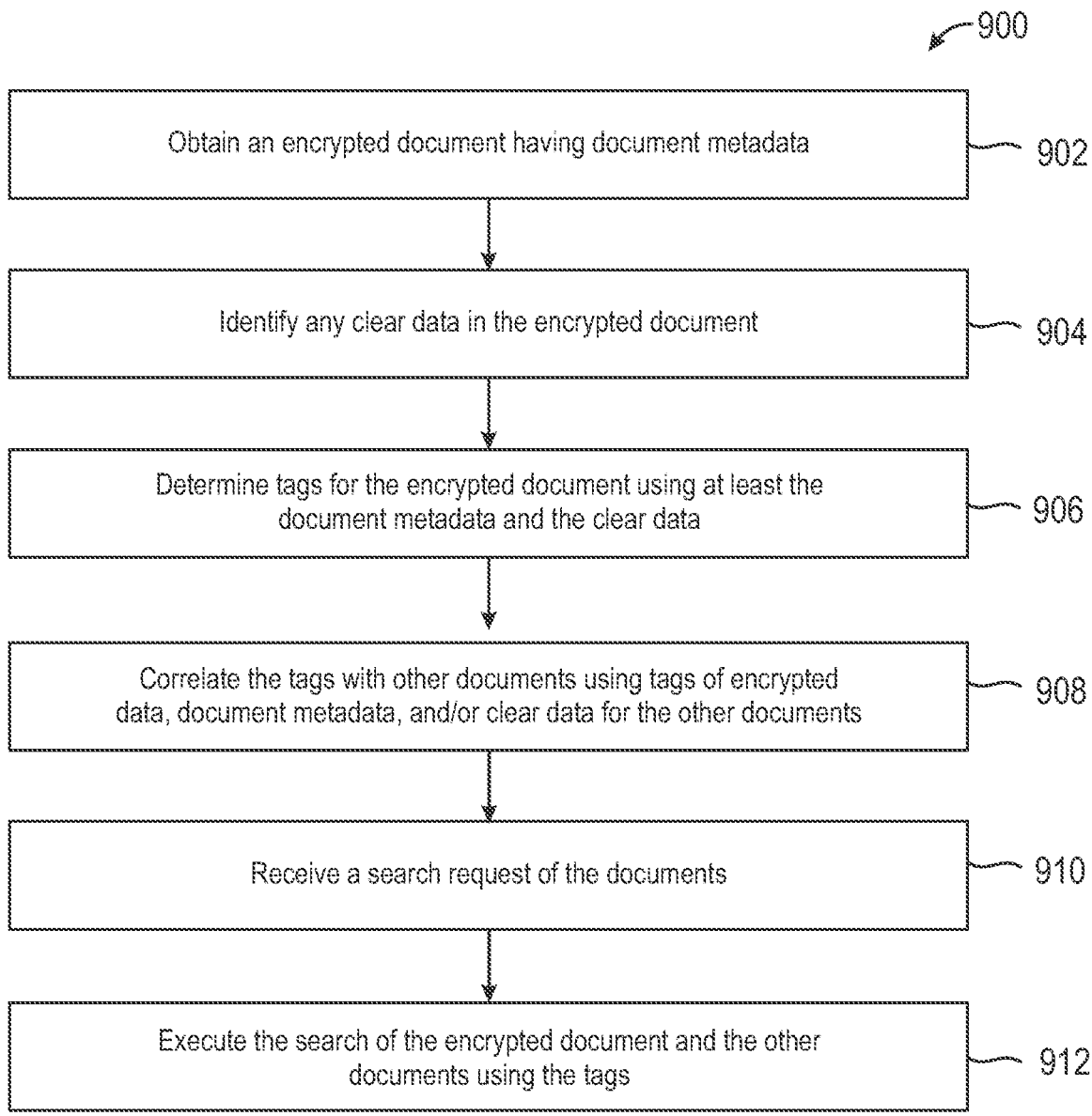
FIG. 9 is a flowchart of a method for indexing files having encrypted data from an adaptive privacy control during correlation and searches of such documents, according to one or more disclosed embodiments.

FIG. 9 is a flowchart 900 of a method for indexing files having encrypted data from an adaptive privacy control during correlation and searches of such documents, according to one or more disclosed embodiments. Note that one or more steps, processes, and methods described herein of flowchart 900 may be omitted, performed in a different sequence, or combined as desired or appropriate.

First, at Step 902, an encrypted document having document metadata is obtained. The encrypted document may correspond to a document having one or more fields, portions, or regions within the document that include APC protected data. The APC protected data in the encrypted document may be first received in clear text and/or clear data so that the data may be properly tagged by an APC protection, indexing, and/or searching system. Thus, at Step 904, any clear data in the encrypted document is identified. The clear data may correspond to data that, prior to providing APC protection and/or encryption requests, may be viewable, indexable, and/or searchable in the encrypted document. The encrypted document may therefore be received with APC requests and designations of the clear data and/or other data or metadata for the document.

At Step 906, tags for the encrypted document are determined using at least the document metadata and the clear data. The tags may be determined by an AI descriptive tagging operation and/or system, which may utilize one or more machine-learning models or other AI techniques in order to tag clear data, as well as encrypted data or data having encrypted portions, metadata, and the like in files or other documents with corresponding tags that describe the underlying data and/or provide information for search operations that allow correlation of the data to other documents, data portions, and the like. At Step 908, the tags are correlated with other documents using tags of the encrypted data, document metadata, and/or clear data for the other documents. This correlation may be used to generate a document or file description of the document, as well as correlate the tags with regions or portions of the document to allow indexing and/or searching of the encrypted document from the APC designations. Further, the correlations may be used to associate the encrypted document with one or more other documents and/or regions of those documents, which may be encrypted or unencrypted and may have the same or similar tags.

At Step 910, a search request of the documents is received. The search request may include one or more search terms, images, video, audio, tags, or the like, which may be requested by a client computing device with a server and/or system that provides APC protection, indexing, and/or searching. Thus, the search request may be submitted to a search engine that utilizes the tags with corresponding tagged regions and encrypted or otherwise APC protected documents and files for searching. This may include using the AI engine to determine or generate the tags or other search terms from the search request. At Step 912, the search is executed of the encrypted document and the other documents using the tags. The search request may be performed using determined tags from the request and corresponding tags of encrypted and/or APC protected documents. Thereafter, a search result may be generated and provided back to the requesting device.

EXAMPLES

Example 1 is a non-transitory computer readable medium that comprises computer executable instructions stored thereon to cause one or more processing units to: obtain a first plurality of unencrypted documents, wherein each document in the first plurality of unencrypted documents comprises: a small index of tags based, at least in part, on a content of the respective document; and a large index of tags based, at least in part, on a predictive analysis of the tags in the small index of the respective document; obtain a second encrypted document, wherein the second encrypted document comprises a small index of tags based, at least in part, on a content of the second encrypted document; create one or more associations between the second encrypted document and one or more documents of the first plurality of unencrypted documents based, at least in part, on the small index of tags of the second encrypted document and the respective small index of tags of the one or more of the first plurality of unencrypted documents; generate a large index of tags for the second encrypted document based, at least in part, on a predictive analysis of the tags in the small index of tags of the second encrypted document; augment the large index of tags for the second encrypted document based, at least in part, on the respective large index of tags for the one or more associated documents of the first plurality of unencrypted documents; receive a query from a first user, wherein the query matches at least one tag in the augmented large index of tags for the second encrypted document; and generate a result set of documents in response to the received query, wherein the result set comprises the second encrypted document.

Example 2 includes the subject matter of example 1, wherein the first plurality of unencrypted documents are each owned by the first user.

Example 3 includes the subject matter of example 1, wherein the instructions to augment the large index of tags for the second encrypted document further comprise instructions to: add at least one of the tags from the large index of tags of at least one of the one or more associated documents into the large index of tags of the second unencrypted document.

Example 4 includes the subject matter of example 1, wherein the instructions to augment the large index of tags for the second encrypted document further comprise instructions to: link the large index of tags of at least one of the one or more associated documents with the large index of tags of the second unencrypted document.

Example 5 includes the subject matter of example 1, wherein the small index of tags for the second encrypted document comprises a user-customized index of tags.

Example 6 includes the subject matter of example 1, wherein the instructions to create one or more associations between the second encrypted document and one or more documents of the first plurality of unencrypted documents further comprise instructions to use at least one of the following: a Markovian data model; neural networks; deep learning techniques; and semantic language training techniques.

Example 7 includes the subject matter of example 1, further comprising instructions to: augment the small index of tags for the second encrypted document based, at least in part, on the respective small index of tags for the one or more associated documents of the first plurality of unencrypted documents.

Example 8 includes the subject matter of example 1, wherein the processing device does not have the ability to decrypt the second encrypted document.

Example 9 includes the subject matter of example 1, wherein the instructions to create one or more associations between the second encrypted document and one or more documents of the first plurality of unencrypted documents further comprise instructions to base the created associations, at least in part, on metadata of the second encrypted document and metadata of the one or more documents of the first plurality of unencrypted documents.

Example 10 includes the subject matter of example 1, further comprising instructions to: obtain an updated version of the second encrypted document, wherein the updated version of the second encrypted document comprises an updated small index of tags based, at least in part, on the updated content of the updated version of the second encrypted document.

Example 11 is a system that comprises: a memory; and one or more processing units, communicatively coupled to the memory, wherein the memory stores instructions to configure the one or more processing units to: obtain a first plurality of unencrypted documents, wherein each document in the first plurality of unencrypted documents comprises: a small index of tags based, at least in part, on a content of the respective document; and a large index of tags based, at least in part, on a predictive analysis of the tags in the small index of the respective document; obtain a second encrypted document, wherein the second encrypted document comprises a small index of tags based, at least in part, on a content of the second encrypted document; create one or more associations between the second encrypted document and one or more documents of the first plurality of unencrypted documents based, at least in part, on the small index of tags of the second encrypted document and the respective small index of tags of the one or more of the first plurality of unencrypted documents; generate a large index of tags for the second encrypted document based, at least in part, on a predictive analysis of the tags in the small index of tags of the second encrypted document; augment the large index of tags for the second encrypted document based, at least in part, on the respective large index of tags for the one or more associated documents of the first plurality of unencrypted documents; receive a query from a first user, wherein the query matches at least one tag in the augmented large index of tags for the second encrypted document; and generate a result set of documents in response to the received query, wherein the result set comprises the second encrypted document.

Example 12 includes the subject matter of example 11, wherein the first plurality of unencrypted documents are each owned by the first user.

Example 13 includes the subject matter of example 11, wherein the instructions to augment the large index of tags for the second encrypted document further comprise instructions to: add at least one of the tags from the large index of tags of at least one of the one or more associated documents into the large index of tags of the second unencrypted document.

Example 14 includes the subject matter of example 11, wherein the instructions to augment the large index of tags for the second encrypted document further comprise instructions to: link the large index of tags of at least one of the one or more associated documents with the large index of tags of the second unencrypted document.

Example 15 includes the subject matter of example 11, wherein the small index of tags for the second encrypted document comprises a user-customized index of tags.

Example 16 includes the subject matter of example 11, wherein the instructions to create one or more associations between the second encrypted document and one or more documents of the first plurality of unencrypted documents further comprise instructions to use at least one of the following: a Markovian data model; neural networks; deep learning techniques; and semantic language training techniques.

Example 17 includes the subject matter of example 11, wherein the instructions further comprise instructions to cause the one or more processing units to: augment the small index of tags for the second encrypted document based, at least in part, on the respective small index of tags for the one or more associated documents of the first plurality of unencrypted documents.

Example 18 includes the subject matter of example 11, wherein the system does not have the ability to decrypt the second encrypted document.

Example 19 includes the subject matter of example 11, wherein the instructions to create one or more associations between the second encrypted document and one or more documents of the first plurality of unencrypted documents further comprise instructions to base the created associations, at least in part, on metadata of the second encrypted document and metadata of the one or more documents of the first plurality of unencrypted documents.

Example 20 includes the subject matter of example 11, wherein the instructions further comprise instructions to cause the one or more processing units to: obtain an updated version of the second encrypted document, wherein the updated version of the second encrypted document comprises an updated small index of tags based, at least in part, on the updated content of the updated version of the second encrypted document.

Example 21 is computer-implemented method, comprising: obtaining a first plurality of unencrypted documents, wherein each document in the first plurality of unencrypted documents comprises: a small index of tags based, at least in part, on a content of the respective document; and a large index of tags based, at least in part, on a predictive analysis of the tags in the small index of the respective document; obtaining a second encrypted document, wherein the second encrypted document comprises a small index of tags based, at least in part, on a content of the second encrypted document; creating one or more associations between the second encrypted document and one or more documents of the first plurality of unencrypted documents based, at least in part, on the small index of tags of the second encrypted document and the respective small index of tags of the one or more of the first plurality of unencrypted documents; generating a large index of tags for the second encrypted document based, at least in part, on a predictive analysis of the tags in the small index of tags of the second encrypted document; augmenting the large index of tags for the second encrypted document based, at least in part, on the respective large index of tags for the one or more associated documents of the first plurality of unencrypted documents; receiving a query from a first user, wherein the query matches at least one tag in the augmented large index of tags for the second encrypted document; and generating a result set of documents in response to the received query, wherein the result set comprises the second encrypted document.

Example 22 includes the subject matter of example 21, wherein the first plurality of unencrypted documents are each owned by the first user.

Example 23 includes the subject matter of example 21, wherein augmenting the large index of tags for the second encrypted document further comprises adding at least one of the tags from the large index of tags of at least one of the one or more associated documents into the large index of tags of the second unencrypted document.

Example 24 includes the subject matter of example 21, wherein augmenting the large index of tags for the second encrypted document further comprises linking the large index of tags of at least one of the one or more associated documents with the large index of tags of the second unencrypted document.

Example 25 includes the subject matter of example 21, further comprising: augmenting the small index of tags for the second encrypted document based, at least in part, on the respective small index of tags for the one or more associated documents of the first plurality of unencrypted documents.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A system, comprising:
a non-transitory memory; and
one or more processing units, communicatively coupled to the non-transitory memory, wherein the non-transitory memory stores instructions executable by the one or more processing units to:
  obtain a first document comprising first encrypted data and first metadata associated with the first document;
  determine whether there is first clear data for the first document;
  determine, based on a first output of an artificial intelligence (AI) engine, one or more first tags for the first encrypted data for the first document based on at least one of the first encrypted data, the first metadata, or the first clear data;
  obtain a plurality of second documents, wherein the plurality of second documents comprise one or more second tags based on at least one of second encrypted data, second metadata, or second clear data for the plurality of second documents;
  create, based on a second output of the AI engine, one or more correlations between the first document and one or more of the plurality of second documents based, at least in part, on the one or more first tags and the one or more second tags; and
  generate a document description of the first document based on the one or more created correlations.

2. The system of claim 1, wherein the first document comprises a first encrypted image, at least one first encrypted video frame, or second encrypted audio and the plurality of second documents comprise a plurality of second images, at least one second encrypted video frame, or second encrypted audio, and wherein the one or more first tags and the one or more second tags are each associated with a portion of pixels or encrypted pixel data for the first encrypted image and the plurality of second images.

3. The system of claim 2, wherein the non-transitory memory stores further instructions executable by the one or more processing units to:
   convert, after obtaining the first document, at least one of the first encrypted data or the first clear data to the pixels or the encrypted pixel data for the first document; and
   associate and encode the pixels or the encrypted pixel data for the first document for a layer or a stream associated with the first document,
   wherein the one or more first tags are determined from the layer or the stream associated with the first document.

4. The system of claim 1, wherein the non-transitory memory stores further instructions executable by the one or more processing units to:
   update, after obtaining the first document, the one or more correlations based on searchable data associated with the first document or the plurality of second documents; and
   store the one or more updated correlations with the first document.

5. The system of claim 1, wherein the non-transitory memory stores further instructions executable by the one or more processing units to:
   apply, after obtaining the first document, one or more pre-encryption tags to the first document,
   wherein one or more first tags are further determined, based on a third output of the AI engine, based on the one or more pre-encryption tags.

6. The system of claim 1, wherein the non-transitory memory stores further instructions executable by the one or more processing units to:
   encode, after generating the document description, the first document with at least one of a privacy flag, a content flag, or a fraud flag based on the document description.

7. The system of claim 1, wherein the first encrypted data comprises a hash of at least a portion of pixels associated with the first document, and wherein the first metadata comprises at least one descriptive image identifier associated with the first document.

8. A non-transitory computer readable medium comprising computer executable instructions stored thereon to cause one or more processing units of a processing device to perform operations, comprising:
   obtaining a first document comprising first encrypted data and first metadata associated with the first document;
   determining whether there is first clear data for the first document;
   determining, based on a first output of an artificial intelligence (AI) engine, one or more first tags for the first encrypted data for the first document based on at least one of the first encrypted data, the first metadata, or the first clear data;
   obtaining a plurality of second documents, wherein the plurality of second documents comprise one or more second tags based on at least one of second encrypted data, second metadata, or second clear data for the plurality of second documents;
   creating, based on a second output of the AI engine, one or more correlations between the first document and one or more of the plurality of second documents based, at least in part, on the one or more first tags and the one or more second tags; and
   generating a document description of the first document based on the one or more created correlations.

9. The non-transitory computer readable medium of claim 8, wherein the first document comprises a first encrypted image, at least one first encrypted video frame, or second encrypted audio and the plurality of second documents comprise a plurality of second images, at least one second encrypted video frame, or second encrypted audio, and wherein the one or more first tags and the one or more second tags are each associated with a portion of pixels or encrypted pixel data for the first encrypted image and the plurality of second images.

10. The non-transitory computer readable medium of claim 9, wherein, after obtaining the first document, the operations further comprise:
   converting at least one of the first encrypted data or the first clear data to the pixels or the encrypted pixel data for the first document; and
   associating and encode the pixels or the encrypted pixel data for the first document for a layer or a stream associated with the first document,
   wherein the one or more first tags are determined from the layer or the stream associated with the first document.

11. The non-transitory computer readable medium of claim 8, wherein, after obtaining the first document, the operations further comprise:
   updating the one or more correlations based on searchable data associated with the first document or the plurality of second documents; and
   storing the one or more updated correlations with the first document.

12. The non-transitory computer readable medium of claim 8, wherein, after obtaining the first document, the operations further comprise:
   applying one or more pre-encryption tags to the first document,
   wherein one or more first tags are further determined, based on a third output of the AI engine, based on the one or more pre-encryption tags.

13. The non-transitory computer readable medium of claim 8, wherein, after generating the document description, the operations further comprise:
   encoding the first document with at least one of a privacy flag, a content flag, or a fraud flag based on the document description.

14. The non-transitory computer readable medium of claim 8, wherein the first encrypted data comprises a hash of at least a portion of pixels associated with the first document, and wherein the first metadata comprises at least one descriptive image identifier associated with the first document.

15. A computer-implemented method, comprising:
   obtaining a first document comprising first encrypted data and first metadata associated with the first document;
   determining whether there is first clear data for the first document;
   determining, based on a first output of an artificial intelligence (AI) engine, one or more first tags for the first encrypted data for the first document based on at least one of the first encrypted data, the first metadata, or the first clear data;

obtaining a plurality of second documents, wherein the plurality of second documents comprise one or more second tags based on at least one of second encrypted data, second metadata, or second clear data for the plurality of second documents;

creating, based on a second output of the AI engine, one or more correlations between the first document and one or more of the plurality of second documents based, at least in part, on the one or more first tags and the one or more second tags; and generating a document description of the first document based on the one or more created correlations.

16. The computer-implemented method of claim 15, wherein the first document comprises a first encrypted image, at least one first encrypted video frame, or second encrypted audio and the plurality of second documents comprise a plurality of second images, at least one second encrypted video frame, or second encrypted audio, and wherein the one or more first tags and the one or more second tags are each associated with a portion of pixels or encrypted pixel data for the first encrypted image and the plurality of second images.

17. The computer-implemented method of claim 16, wherein, after obtaining the first document, the computer-implemented method further comprises:

converting at least one of the first encrypted data or the first clear data to the pixels or the encrypted pixel data for the first document; and associating and encode the pixels or the encrypted pixel data for the first document for a layer or a stream associated with the first document, wherein the one or more first tags are determined from the layer or the stream associated with the first document.

18. The computer-implemented method of claim 15, wherein, after obtaining the first document, the computer-implemented method further comprises:

updating the one or more correlations based on searchable data associated with the first document or the plurality of second documents; and storing the one or more updated correlations with the first document.

19. The computer-implemented method of claim 15, wherein, after obtaining the first document, the computer-implemented method further comprises:

applying one or more pre-encryption tags to the first document, wherein one or more first tags are further determined, based on a third output of the AI engine, based on the one or more pre-encryption tags.

20. The computer-implemented method of claim 15, wherein, after generating the document description, the computer-implemented method further comprises:

encoding the first document with at least one of a privacy flag, a content flag, or a fraud flag based on the document description.

* * * * *